United States Patent
Shenker et al.

(10) Patent No.: US 7,152,782 B2
(45) Date of Patent: Dec. 26, 2006

(54) SYSTEM AND METHOD FOR MANAGING ELECTRONIC DATA TRANSFER APPLICATIONS

(75) Inventors: Gavin Shenker, Los Angeles, CA (US); Thanigaivel Ashwin Raj, Newark, CA (US); Jagdeep Singh Sahota, Rodeo, CA (US); Forough Kashef, Fremont, CA (US); Simon Hurry, Foster City, CA (US)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 10/826,092

(22) Filed: Apr. 16, 2004

(65) Prior Publication Data

US 2005/0006461 A1    Jan. 13, 2005

Related U.S. Application Data

(60) Provisional application No. 60/486,578, filed on Jul. 11, 2003.

(51) Int. Cl.
*G06F 7/10* (2006.01)

(52) U.S. Cl. .................. 235/376; 235/375; 235/382; 705/14; 705/24

(58) Field of Classification Search .............. 235/375, 235/492, 379, 382; 705/13, 15–17, 26
See application file for complete search history.

(56) References Cited

U.S. PATENT DOCUMENTS

| | | | | |
|---|---|---|---|---|
| 5,541,985 A | * | 7/1996 | Ishii et al. ............... 379/111 |
| 5,578,808 A | * | 11/1996 | Taylor ....................... 235/380 |
| 5,770,843 A | * | 6/1998 | Rose et al. ................ 235/380 |
| 5,892,824 A | * | 4/1999 | Beatson et al. ............ 713/186 |
| 6,142,369 A | * | 11/2000 | Jonstromer ................ 235/380 |
| 6,233,683 B1 | * | 5/2001 | Chan et al. ................ 713/172 |
| 6,257,486 B1 | * | 7/2001 | Teicher et al. ............. 235/380 |
| 6,411,822 B1 | * | 6/2002 | Kraft ......................... 455/558 |
| 6,466,783 B1 | | 10/2002 | Dahm et al. |
| 6,481,632 B1 | | 11/2002 | Wentker et al. |
| 6,606,606 B1 | | 8/2003 | Starr |
| 6,618,722 B1 | | 9/2003 | Kao et al. |
| 6,658,268 B1 | | 12/2003 | Bodnar et al. |
| 6,659,345 B1 | * | 12/2003 | Sukeda et al. ............. 235/382 |
| 6,718,314 B1 | | 4/2004 | Chaum et al. |
| 6,738,766 B1 | | 5/2004 | Peng |
| 6,776,332 B1 | * | 8/2004 | Allen et al. ................ 235/380 |

* cited by examiner

*Primary Examiner*—Seung Ho Lee
(74) *Attorney, Agent, or Firm*—W. Joseph Melnik; Pepper Hamilton LLP

(57) ABSTRACT

A system and method for managing one or more applications deployed on a mobile electronic device, such as a cellular phone, are disclosed. The system and method enable the user of a mobile electronic device to select one of a plurality of applications deployed on the mobile electronic device for use in a transaction and to authenticate himself or herself prior to initiating the transaction. The transaction may occur via a wireless interface and/or a contact-based interface. In addition, the system and method allow the user to manage applications deployed on a mobile electronic device, including adding new applications, designating nicknames for the applications and setting security codes for each application.

53 Claims, 22 Drawing Sheets

SYSTEM AND METHOD FOR MANAGING ELECTRONIC DATA TRANSFER APPLICATIONS

CROSS-REFERENCE TO RELATED APPLICATIONS

The present application claims priority to U.S. Provisional Application No. 60/486,578, filed on Jul. 11, 2003, and entitled "A System and Method for Managing and Conducting Transactions over a Wireless Interface."

INTRODUCTION

The present invention provides a system and method for managing one or more applications deployed on a mobile electronic device, such as a cellular phone. The present invention enables the user of a mobile electronic device to select one of a plurality of applications deployed on the mobile electronic device for use in a data transfer transaction and to authenticate himself or herself to the application prior to initiating the transaction. In addition, the present invention allows the user to manage applications deployed on a mobile electronic device, including adding new applications, designating nicknames for the applications and setting authentication codes for each application.

BACKGROUND OF THE INVENTION

Consumers today have a myriad of financial instruments available to them for conducting a consumer transaction at a point of sale. For example, as part of almost every transaction, consumers are asked to choose between any number of different payment options, including credit cards, debit cards, cash and checks. In addition, consumers commonly carry more than one of each type of these instruments which have been issued by different or even the same financial institution, such as multiple credit cards issued by different banking institutions. Furthermore, consumers may also carry instruments ancillary to consummating the transaction, such as loyalty cards or coupons which may be used in the course of a transaction. Each of these instruments has a separate physical embodiment that the consumer must carry to use. Commonly, these physical instruments are carried in a wallet or pocketbook, are attached to keychains, or are otherwise carried to facilitate use.

In a typical transaction, a consumer approaches the point of sale to purchase one or more items. The point of sale may be automated or attended by a representative of the merchant. The items to be purchased are identified to a point of sale device, such as a cash register, and the total bill of sale may be determined. At that time, the consumer may be requested to identify his means of payment. The consumer may then need to physically search his wallet for the desired payment instrument and present that instrument at the point of sale to conduct a transaction.

Recent technological advances have sought to combine the myriad of payment instruments found in a typical consumer's wallet onto a single electronic device. Essentially, these advances have sought to take advantage of the existing processing power of mobile electronic devices such as cellular phones, personal digital assistants and similar devices. The data and processing requirements for a particular payment means (e.g. credit card transaction, debit transaction, stored value transaction, etc.) are deployed onto the mobile electronic device. When the consumer seeks to utilize a particular application, the application is enabled on the mobile electronic device and conducts the transaction with a point of sale terminal.

Mobile electronic devices enabled to engage in financial transactions may be equally effective in any transfer of data, whether related to financial transactions or not. Thus, the applications deployed on such devices have expanded to include business-to-business exchanges and peer-to-peer exchanges. Importantly, communications between the mobile electronic device and the point of sale terminal (in the case of consumer financial transactions) or a second electronic device (in the case of business to business, peer to peer and other transactions) may be conducted in a wireless environment.

As more applications are deployed on a mobile electronic device, a need exists to manage the deployed applications. Accordingly, what is needed is a method and system for managing the deployed applications on a mobile electronic device which allows the user of the device to select an application from all deployed applications, regardless of the service provider which deployed the application.

Furthermore, the user should be able to add and remove applications from the device easily and effectively.

The present disclosure, including the appended claims, is directed to solving one or more of these problems.

SUMMARY OF THE INVENTION

The present invention provides a system and method for managing one or more applications deployed on a mobile electronic device. The applications may be provided by a variety of service providers to perform various methods of data transfer or other functions. For example, applications may enable consumer transactions, such as the purchase of goods from a merchant using a credit or debit account; may enable business-to-business data transfers, such as the transfer of technical or accounting data between commercial entities; or peer-to-peer data transfers where personal information is transferred.

The present invention, also referred to herein as the primer, runs continuously in the background of the mobile electronic device. After a new application is installed on the mobile electronic device, the primer may initiate a registration procedure for the new application wherein a nickname may be associated with the new application. The nickname is assigned by the user of the mobile electronic device to assist the user in identifying the application (e.g. work credit card, gas station card, airline frequent flyer card). In addition, registration will allow a passcode to be associated with the application. Without entry of a correct passcode, the application may remain inactive. The service provider may assign an initial passcode when a new application is installed. The primer may store the passcode in an encrypted file for future use.

In an embodiment of the present invention, an authorized user may change the passcode for a particular application after installation. In addition, the service provider that deployed the application may reset the passcode by transmitting a new passcode to the mobile electronic device when it is communicating with the service provider. A reset code may be entered on the keypad of the mobile electronic device in order to cause the service provider to transmit a set of instructions to the mobile electronic device causing the passcode for a particular application to be reset to an original or default value.

DETAILED DESCRIPTION OF THE INVENTION

Figure 1A:
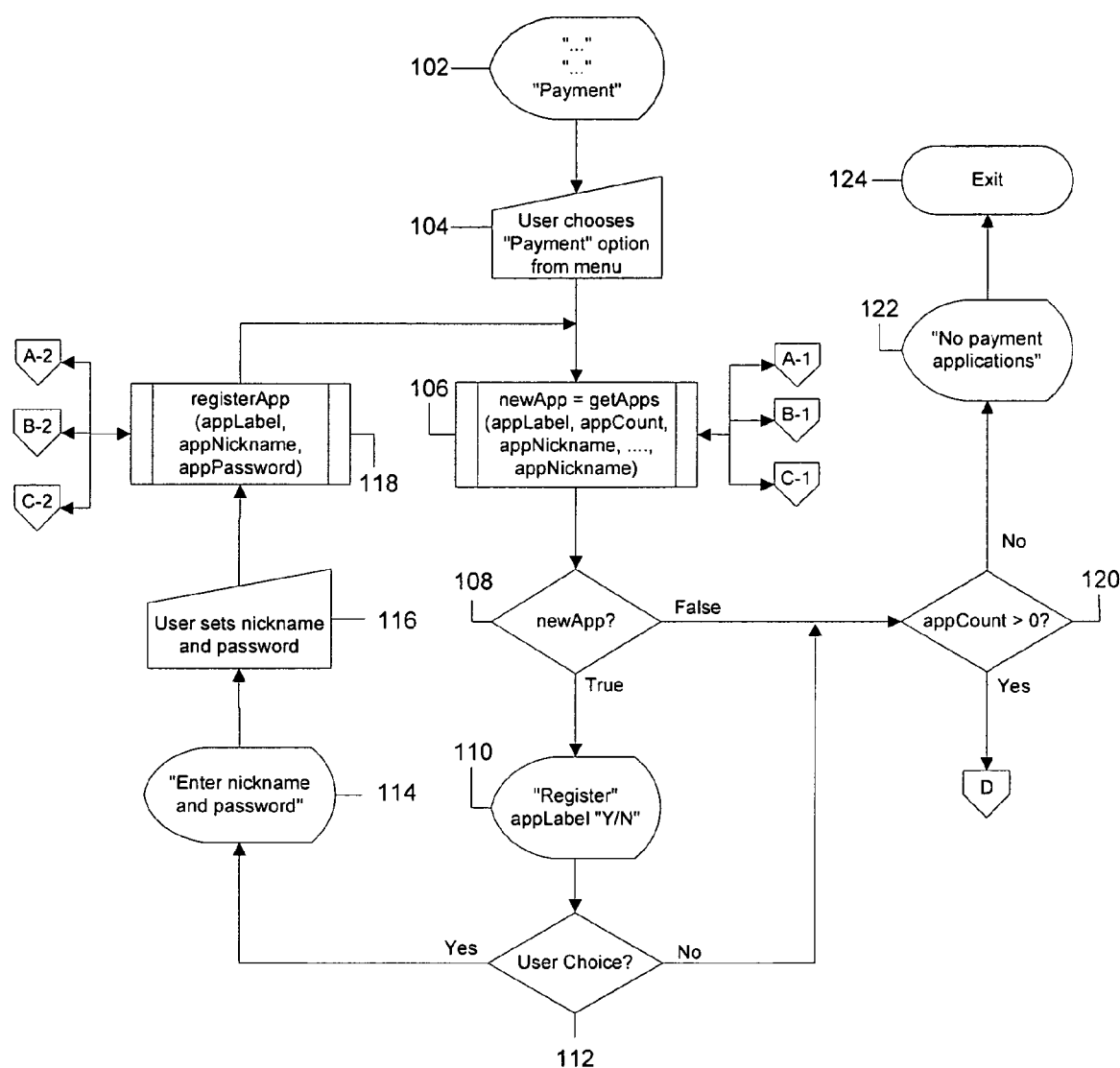
FIGS. 1A–B are a flow diagram of a processing performed by an exemplary primer according to an embodiment of the present invention incorporating multiple process flows.

Before the present methods are described, it is to be understood that this invention is not limited to the particular methodologies or protocols described, as these may vary. It is also to be understood that the terminology used in the description is for the purpose of describing the particular versions or embodiments only, and is not intended to limit the scope of the present invention. In particular, although the present invention is described in conjunction with a financial transaction, it will be appreciated that the present invention may find use in any electronic transfer of data.

It must also be noted that as used herein, the singular forms "a", "an", and "the" include plural reference unless the context clearly dictates otherwise. Thus, for example, reference to an "application" is a reference to one or more applications and equivalents thereof known to those skilled in the art, and so forth. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications mentioned herein are incorporated by reference. Nothing herein is to be construed as an admission that the invention is not entitled to antedate such disclosure by virtue of prior invention.

For purposes of this application, "mobile electronic device" shall mean any device comprising functionality for storing one or more applications, communicating with a second device (which may or may not be a mobile electronic device), and performing the processing required by the present invention. Without limiting the foregoing, examples of a mobile electronic device include a cellular phone with or without a subscriber information module, a cellular phone with a removable storage medium such as a memory card, a subscriber information module, a removable memory card, a personal digital assistant (PDA), a pager, a walkie-talkie or an integrated circuit card.

For purposes of this application, "passcode" shall mean an authentication code or other security measure including, but not limited to, biometrics, a signature, or a personal identification number required to activate an application deployed on a mobile electronic device. The service provider providing the application or the user may set the passcode. The user may change the passcode regardless of which entity initially set the passcode.

The present invention provides a method and system for managing applications deployed on a mobile electronic device wherein the applications operate in either a wireless communication environment or a contact based communication environment, depending on the capabilities of the mobile electronic device. Preferably, the mobile electronic device is capable of wireless communication with a second device, although the present invention will be equally effective if the mobile electronic device must be physically coupled to a second device to communicate.

The present invention also provides a method and system for registering one or more new applications and accessing one or more applications. The registration may include detecting new applications, receiving information for each new application, and storing the information to permit access to the new application through the primer. Accessing an application may include selecting the application from a list of one or more applications, entering a passcode, comparing the entered passcode with a stored passcode, and running the application if the passcodes match. If the passcodes do not match, the user may preferably attempt to enter the passcode again. Preferably, a predetermined number of passcode attempts are allowed. Accessing the application may further include the option of modifying or viewing one or more settings pertaining to the application.

The following description and the appended figures describe the present invention in conjunction with payment applications. However, those with ordinary skill in the art will recognize that the following description is applicable to any type of application loaded onto a mobile electronic device. The descriptions with reference to payment applications are merely provided as exemplary embodiments of the present invention, which is not meant to be limited to such embodiments.

FIGS. 1A through 6E depict a preferred embodiment of the present invention having three separate process flows. The first process flow of the primer (depicted by A-1 through A-5 and further depicted in FIGS. 2A–E and 3A–D) interfaces with a secure memory location such as a smartcard or a Universal Subscriber Identity Module ("(U)SIM") containing payment applications controlled by a payment environment application having special runtime access privileges. The second process flow of the primer (depicted by B-1 through B-5 and further depicted in FIGS. 4A–E and 5A–B) interfaces with a secure memory location such as a smartcard or a (U)SIM containing payment applications that are each wrapped within a separate controlling application. The third process flow of the primer (depicted by C-1 through C-5 and further depicted in FIGS. 6A–E) stores all payment information in memory and controls access to the payment information which is stored in that memory.

In FIG. 1A, the mobile electronic device initially may display a list of options including a payment option to the user via the display on the mobile electronic device 102. If the user selects the payment option from the list of options 104, the primer may initiate a process for selecting a payment application. The primer initially generates a list of available payment applications 106 with new applications designated for registration.

Figure 2A:
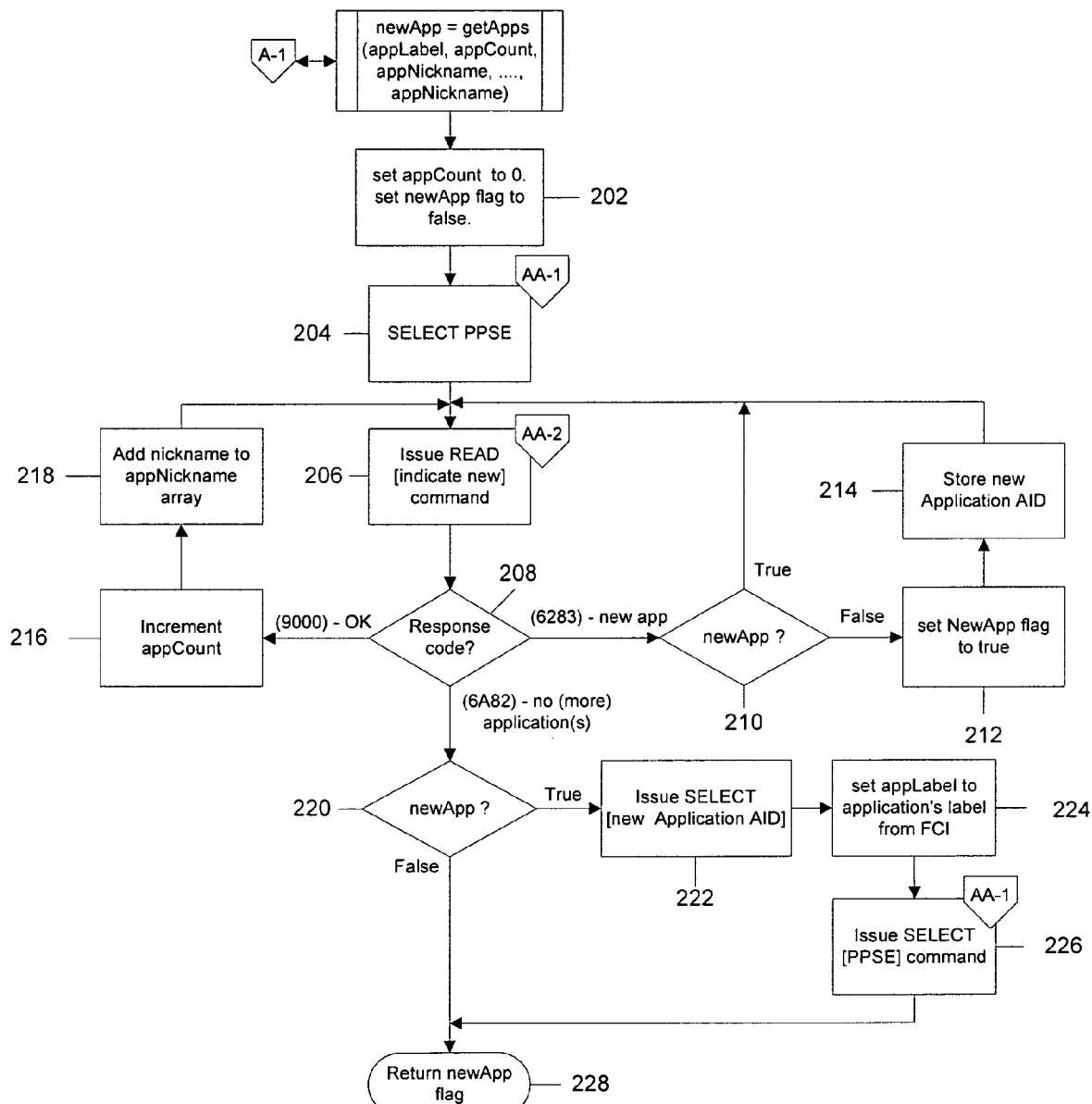
FIGS. 2A–E are flow diagrams of particular functions identified in FIGS. 1A–B according to an exemplary process flow embodiment of the present invention.

In an embodiment, the list of available payment applications may be generated by the process shown in conjunction with FIG. 2A. The process begins with initialization of an application counter and a new application flag (newApp) 202. For example, the application counter may be set to zero and the newApp flag may be set to "false". The application counter is used to maintain the number of applications which comprises the list being generated. The new application flag is used to distinguish registered applications from unregistered applications. A payment environment is then selected 204 for use. The processing of the Select PPSE 204 command is discussed in detail below in conjunction with FIG. 3A. The primer then obtains information regarding the first available application 206 in the selected payment environment, via a sub-routine such as is shown in FIG. 3B. Subsequent iterations of the processing shown in FIG. 2A will result in step 206 being executed as necessary to obtain information regarding each of the available applications in the selected payment environment.

As shown in FIG. 3B, the primer initially may attempt to locate a payment application to process 320. If there are no payment application available or if all of the available payment applications have been previously processed 322, an error code is returned to the calling application 324. Otherwise, a payment application flag is checked to see if the flag is set 326. If the flag is set, the primer determines whether the payment application is new 328. If the payment application is new, the payment application state variable may be set to a personalized state 330 and the application's identifier (AID) and a warning code may be returned to the calling application 332. In this context, the calling application uses the warning code to identify the existence of a new payment application requiring registration. If the payment application is not new or the flag is not set, the life cycle state of the payment application is checked 333, and if the life cycle state is not already locked, it is set to locked 334. Thereafter, the payment application's nickname and an OK code are returned to the calling process 336.

Returning to FIG. 2A, the primer may then examine 208 the response code returned by the process of FIG. 3B. If the response code indicates a new payment application, the primer then checks the new application flag (newApp) 210. In the initial processing of this step, the check of the new application flag will always return "false" which is the default value the new application flag was set to in step 202. The newApp flag is then set to "true" 212 and the AID for the new payment application is stored 214. If the check of the response code 206 indicates that a previously registered (i.e., not new) payment application is present, an application counter (appCount) may be incremented 216 and the nickname for the payment application may be added to the application nickname array (appNickname) 218. The primer may then continue processing at step 206. At step 206, the sub-routine shown in FIG. 3B is again called to locate any additional payment applications.

When either no payment applications are present, or all of the payment applications have been processed, an error code 324 is returned from the sub-routine shown in FIG. 3B and the check of the response code 208 results in the new applications flag being checked 220. If no applications were present or if all of the applications present have already been registered, the new applications flag will be "false", the default value it was set to in step 202. If there was at least one new application present, the new applications flag will be "true" and the primer may obtain information regarding the new payment application 222, such as the recognizable label of the new application. The label is then stored for the new payment application 224. The payment environment originally selected at step 204 is then again selected 226, such as via the process shown at FIG. 3A (discussed below).

Figure 4A:
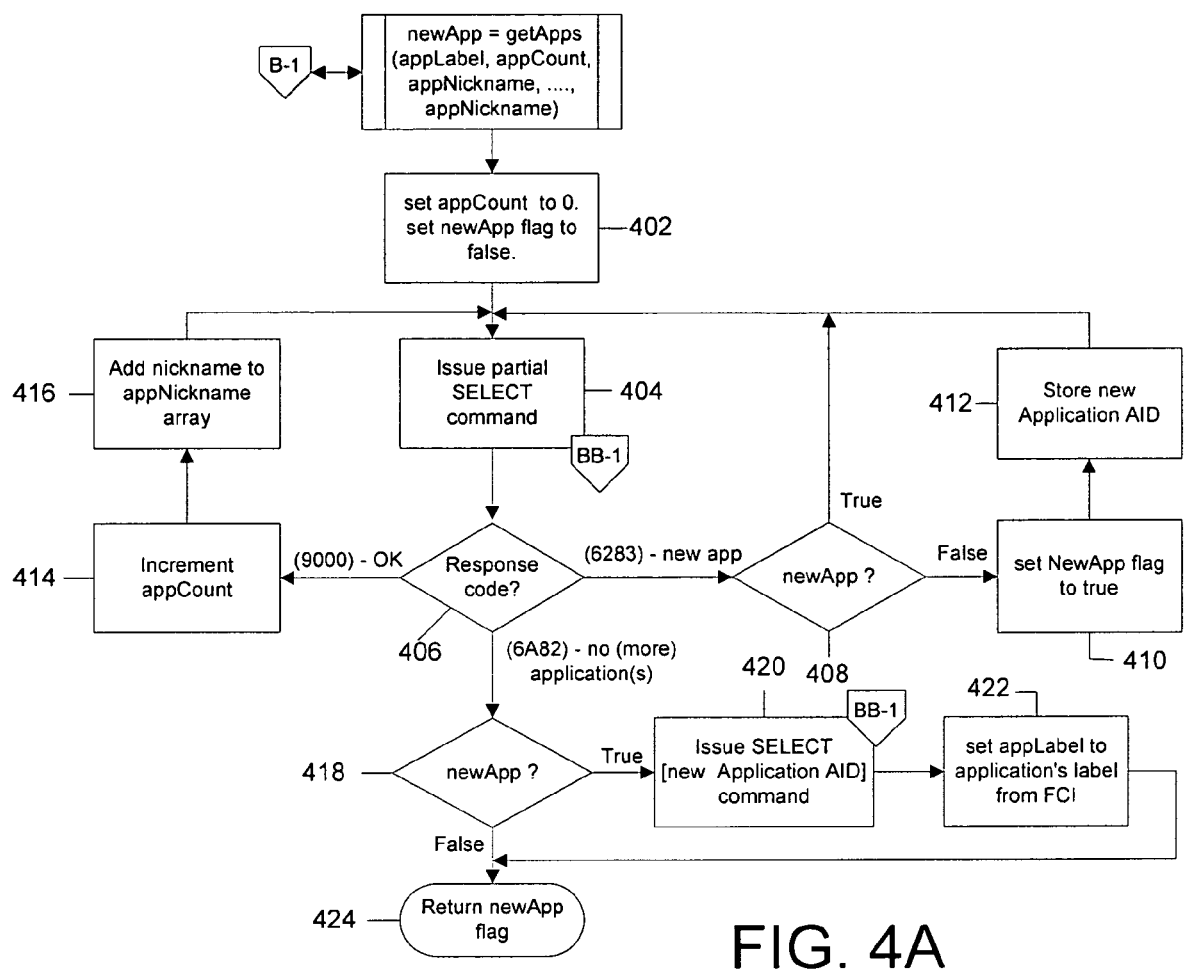
FIGS. 4A–E are flow diagrams of particular functions identified in FIGS. 1A–B according to an exemplary process flow embodiment of the present invention.

In an alternate embodiment, the list of available payment applications generated at step 106 of FIG. 1A, may utilize the process shown in FIG. 4A. As shown in FIG. 4A, the primer initializes the application counter (appCount) variable to zero and new application flag (newApp) variable to "false" 402 and issues a SELECT command with a partial application identifier which is used in an iterative process to identify all payment applications. As an embodiment, the operation of the partial SELECT command is described below with reference to FIG. 5A and FIG. 5B starting at 520.

Figure 5A:
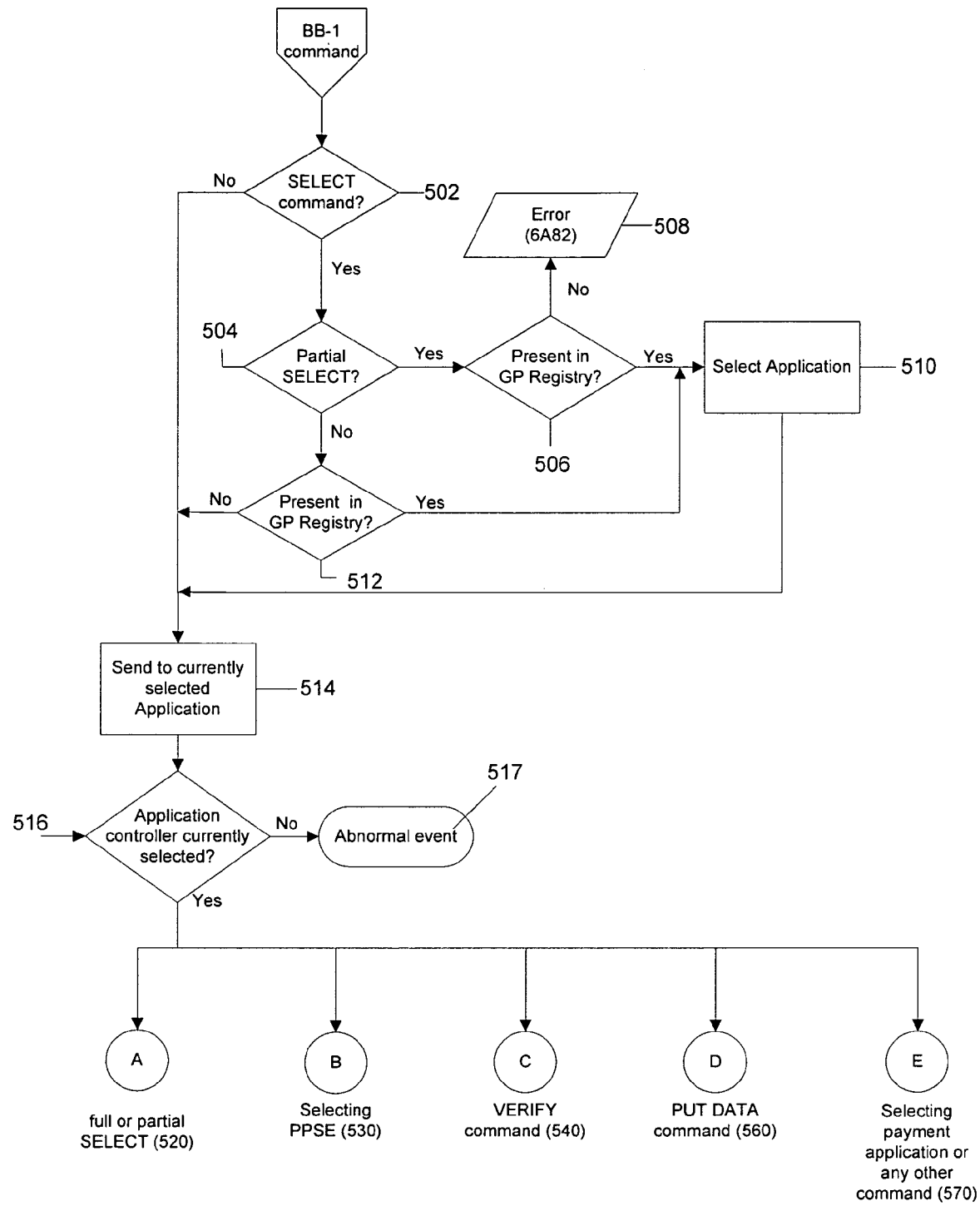
FIGS. 5A–B are a flow diagram of command operations identified in FIGS. 4A–E according to an exemplary process flow embodiment of the present invention.
Figure 5B:
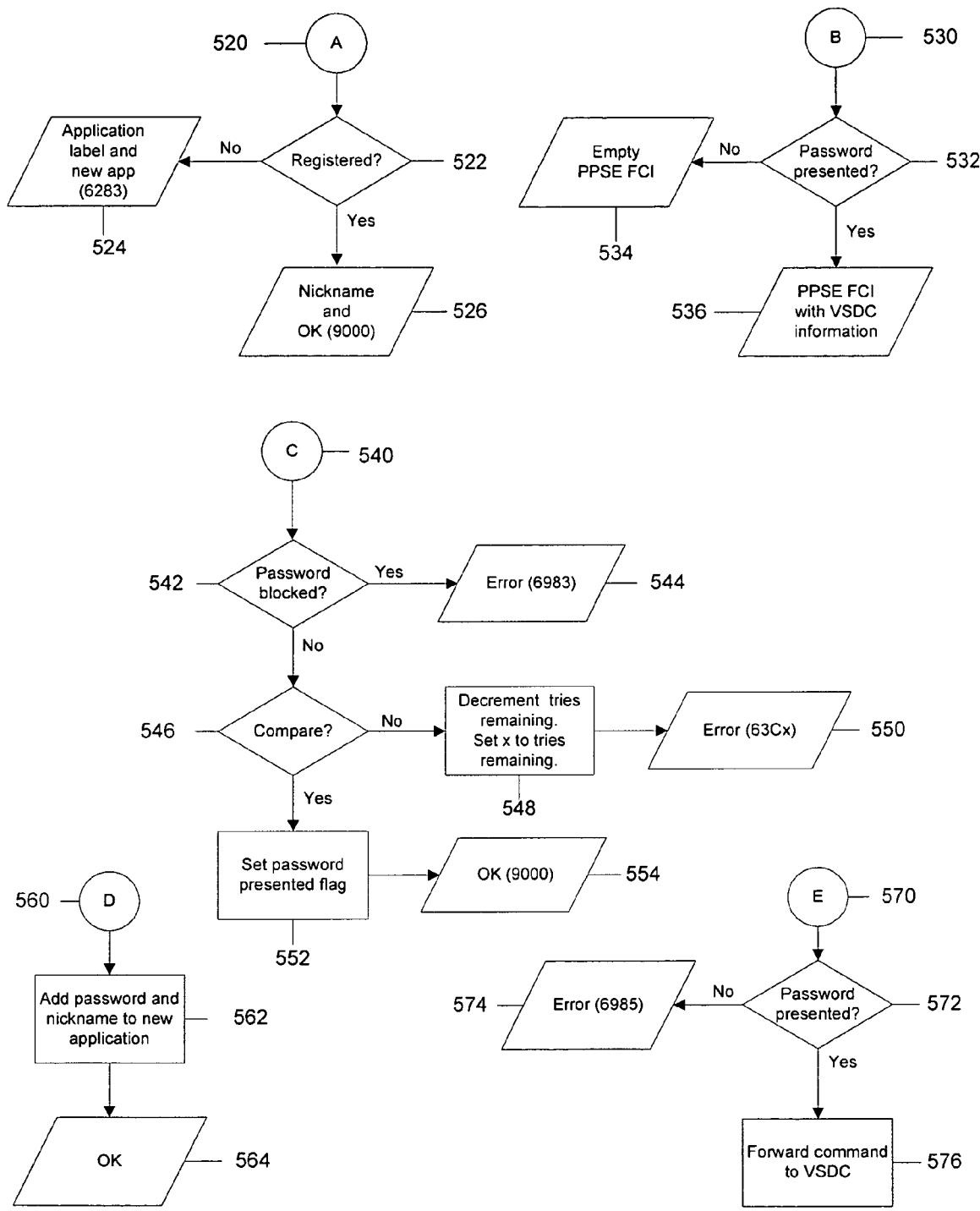

As shown in FIG. 5A, since a partial SELECT command is issued, the decisions at 502 and 504 are each answered affirmatively. A determination of whether the selected application is in an application registry is then made 506. If the application is not in the registry, an error code is returned 508. Otherwise, if the application is in the registry, the payment application is selected from the registry 510. The partial SELECT command is transferred to the selected payment application 514. The payment processing command is then checked to determine how the payment application is appropriately executed. A determination is made as to whether the controller for the appropriate application has been selected 516. This determination will return "yes" in every instance except upon occurrence of an abnormal event 517, such as when no application controllers exist on the device. If the controller for the appropriate application has been selected, the partial SELECT command is executed 520. As shown in FIG. 5B, a determination whether the payment application is registered 522 is made. If the payment application is not registered, a recognizable label may be provided for the payment application and a new application response code is returned 524 to the processing in FIG. 4A. If the payment application is registered, a nickname and an OK response code may be returned 526 to the process in FIG. 4A.

Returning to FIG. 4A, the primer may then examine 406 the response code returned by the partial SELECT command 404. If the response code indicates a new payment application 406, the newApp flag is then checked 408. In the initial processing of the sub-routine shown in FIG. 4A, the newApp flag will always be its default value of "false" when checked at step 408. The newApp flag is then set to "true" 410 and the AID for the new payment application is stored 412. The progressing is then repeated beginning at step 404.

If the code returned at step 404 indicates that the payment application is not new 406, an application counter (appCount) may be incremented 414 and the nickname for the payment application may be added to the application nickname array (appNickname) 416. The primer will repeat the process by returning to step 404 to determine if additional applications are present.

When either no payment applications are present or all of the payment applications have been processed, the code returned by the function call at 404 will indicate there are no, or no further, applications to process 406. The newApp flag is then examined 418. If there are no applications present, the newApp flag will be set to its default value of "false" and the newApp flag will be returned to the processing shown in conjunction with FIG. 1A. If there is at least one new application present, the newApp flag will be set to "true", and the primer may issue a full SELECT command 420, which ensures that the new application is the currently selected application rather than the previously selected application. An embodiment of the operation of the full SELECT command is described with reference to FIG. 5A and FIG. 5B starting at 520.

Since a full SELECT command is issued, the decision at 502 is answered affirmatively. In this instance, the command is not a partial SELECT command, and the decision at 504 is answered negatively. A determination of whether the selected application is in an application registry is then made 512. If the application is in the registry, the transferred application is selected from the registry 510. The SELECT command is then transferred to the currently selected application 514, and a determination is made as to whether the controller for the appropriate application is currently selected 516. This determination will return "yes" in every instance except upon occurrence of an abnormal event 517, such as when no application controllers exist on the device. If the controller for the appropriate application is selected, the SELECT command is executed as described above with reference to FIGS. 5B and 520–526.

Figure 6A:
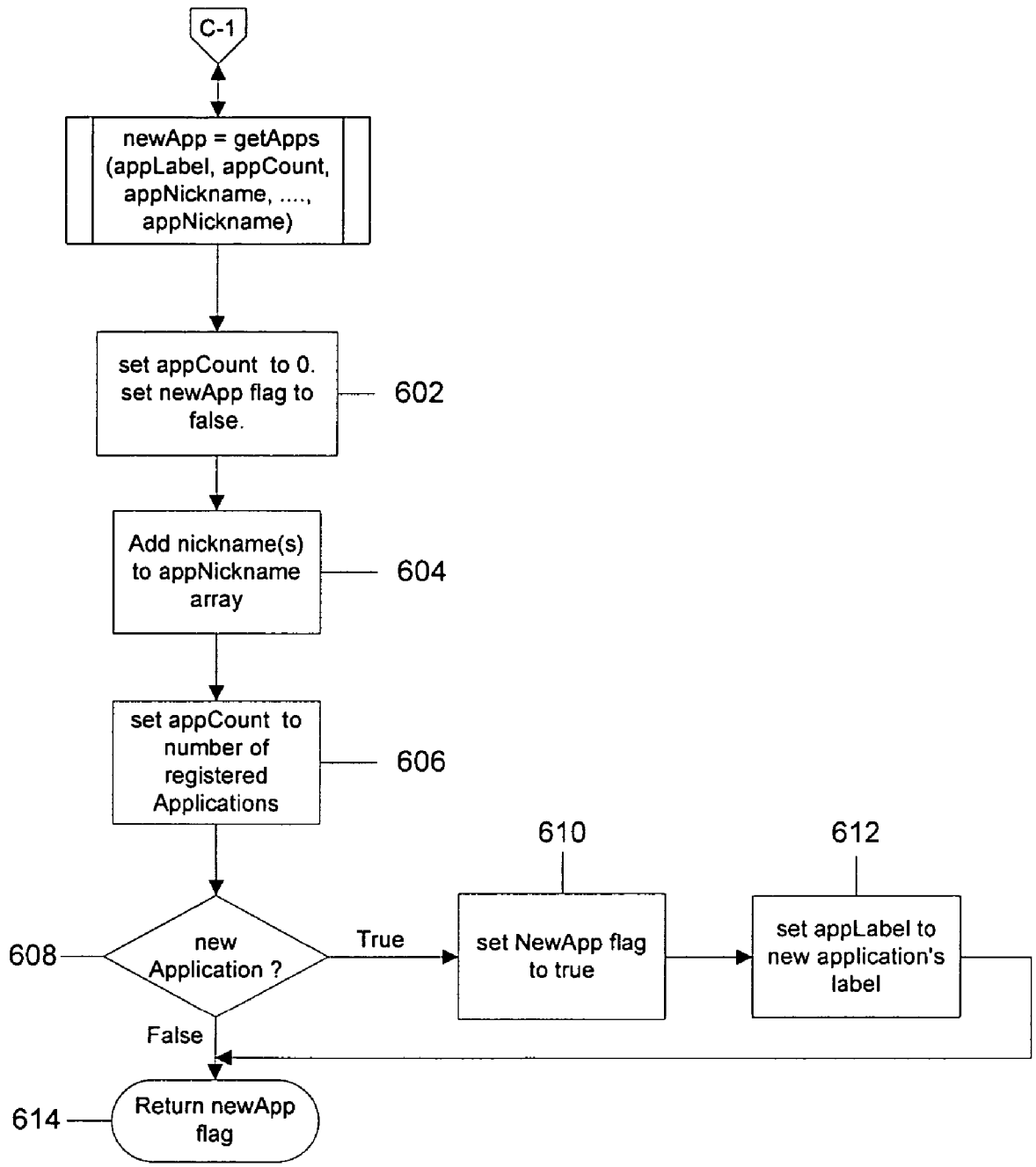
FIGS. 6A–E are flow diagrams of particular functions identified in FIGS. 1A–B according to an exemplary process flow embodiment of the present invention.

In an alternate embodiment, the list of available payment applications generated at step 106 of FIG. 1A may utilize the process shown in FIG. 6A. As shown in FIG. 6A, an application counter (appCount) will be initialized to zero and a new applications flag (newApp flag) will be initialized to "false" 602. In addition, one or more nicknames for the payment applications may be added to an array of application nicknames (appNickname array) 604, and the application counter may be set to the number of registered payment applications 606. The primer may then detect whether a new payment application exists 608. If a new payment application does exist the newApp flag may be set to "true" 610 and the appLabel variable may be set to the new application's label 612. Upon assignment of the new application's label 612 or if no new application is found, the newApp flag may be returned to the processing shown at FIG. 1A.

Returning now to FIG. 1A, the newApp flag is examined to determine if one or more new payment applications have been added 108. If a new payment application exists, the primer may prompt the user to decide whether to register the new payment application 110. If the user opts not to register the new application, processing will continue at step 120 as described below. If the user opts to register a new payment application 112, the primer may display a prompt for the user to enter a nickname and passcode for the new payment application 114. The user may then enter a nickname and a passcode 116, and the primer may register the payment application 118.

Figure 2B:
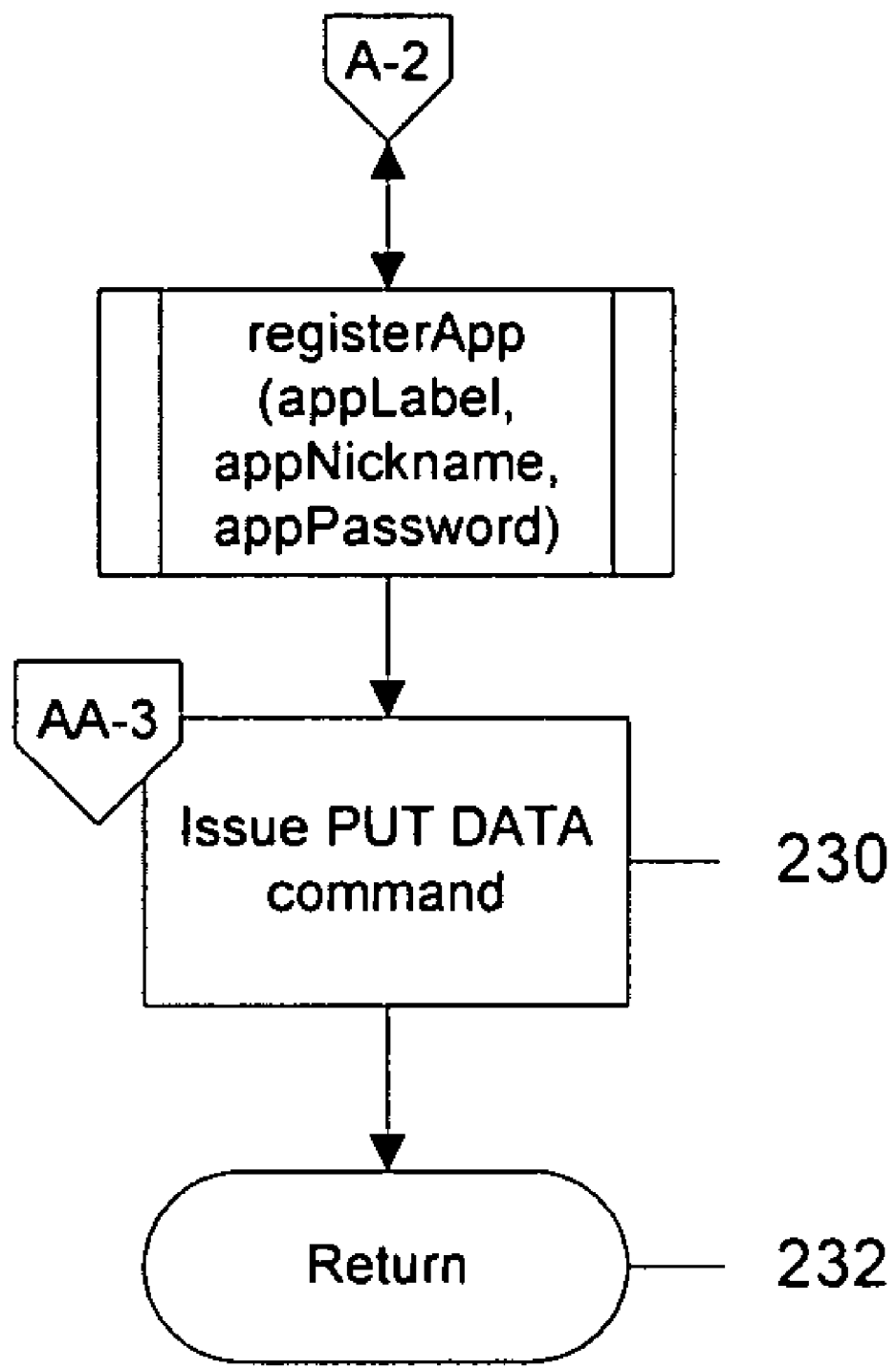

In an embodiment, the registration process is performed utilizing the process shown in FIG. 2B. As shown in FIG. 2B, the payment application registration process may issue a PUT DATA command 230 including the label, nickname and passcode (appLabel, appNickname and appPasscode) for the new payment application. As shown in FIG. 3C, the operation of the PUT DATA command 230 causes the passcode and nickname to be stored in the data record for the new payment application 340 and the return of an OK code to the calling process 342. The registration of the new payment application may then return to the process of FIG. 1A 232.

Figure 4B:
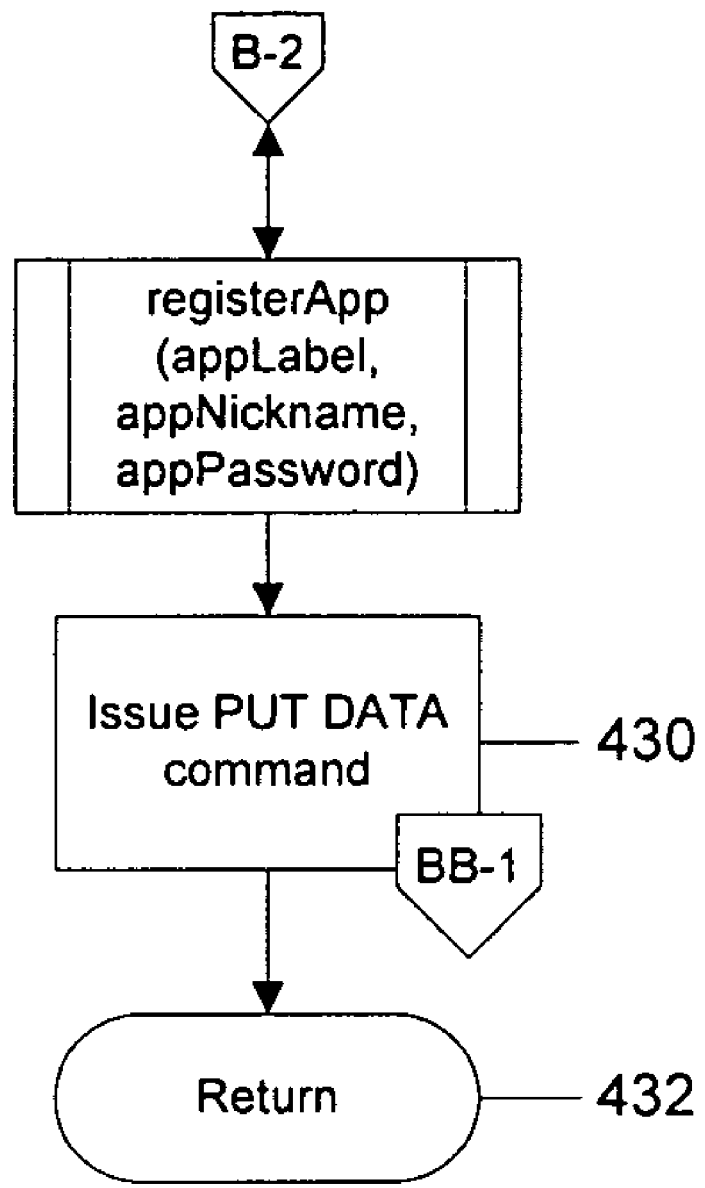

In an alternate embodiment, the registration process is performed utilizing the process shown in FIG. 4B. As shown in FIG. 4B, the payment application registration process may issue a PUT DATA command 430 including the label, nickname and passcode (appLabel, appNickname and appPasscode) for the new payment application. The operation of the PUT DATA command is described with reference to FIGS. 5A and 5B starting at 560.

As shown in FIG. 5A, since the PUT DATA command is not a SELECT command, the decision at 502 is answered negatively. Therefore, PUT DATA command is then transferred to the currently selected application 514, and a determination is made as to whether the controller for the appropriate application is currently selected 516. This determination will return "yes" in every instance except upon occurrence of an abnormal event 517, such as when no application controllers exist on the device. If the controller for the appropriate application is currently selected, the PUT DATA command is executed 560. As shown in FIG. 5B, information, such as a passcode and a nickname for the payment application may be added to the data record for the new payment application 562 and a code is returned indicating successful completion of the process 564. The process then returns to FIG. 4B 564. Upon completion of the PUT DATA command 430, the registration of the new payment application may return 432 to the processing shown in FIG. 1A.

Figure 6B:
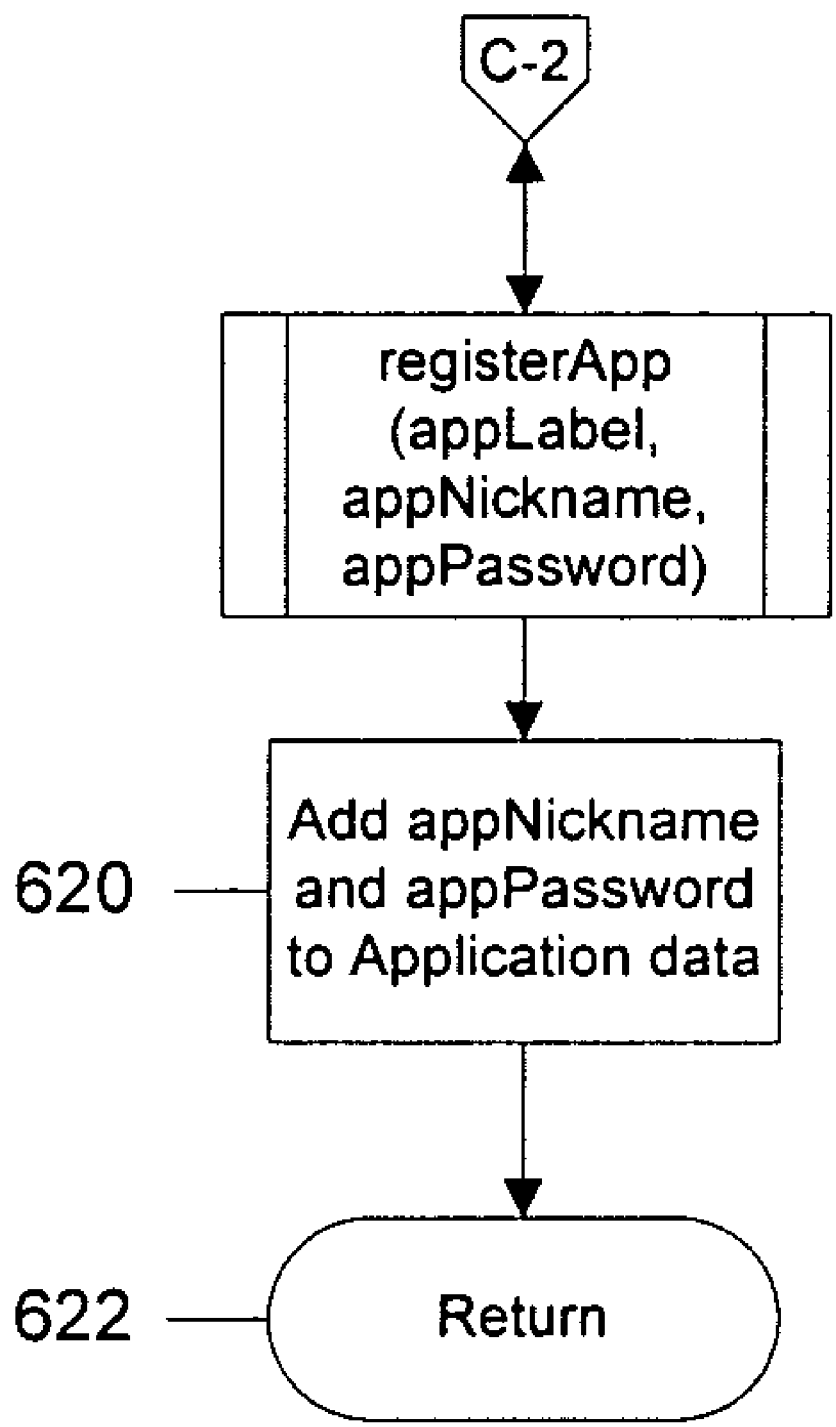

In an alternate embodiment, the registration process is performed utilizing the process shown in FIG. 6B. As shown in FIG. 6B, the payment application registration process may add the application nickname and passcode (appNickname and appPasscode) variable values to the new payment application data 620 and return to the calling application 622.

Figure 1B:
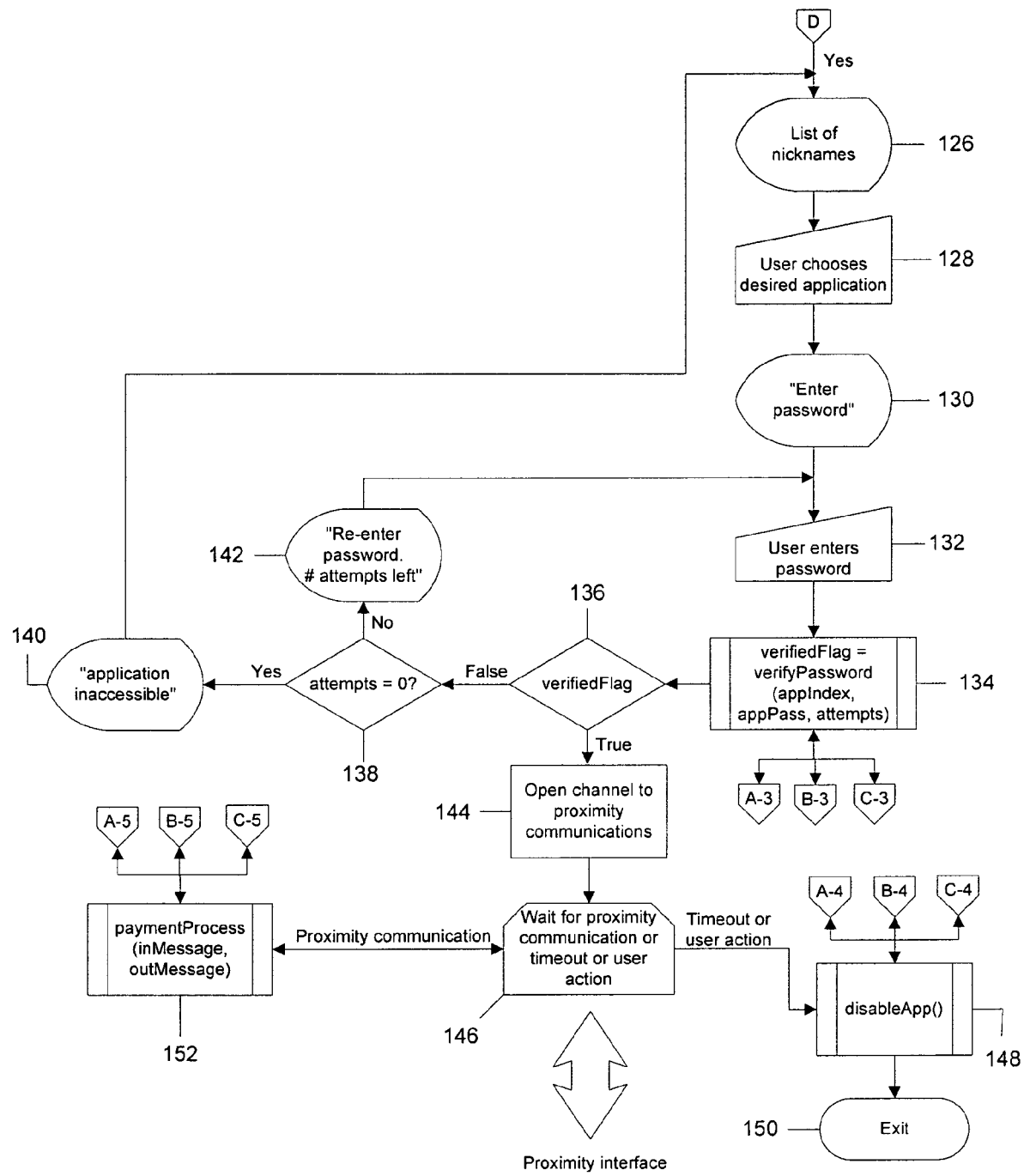

Returning again to FIG. 1A, once the new application has been registered, the process will be repeated beginning at step 106. When there are either no applications, no new applications, or once all new payment applications have been registered, the check of the newApp flag 108 will be "false". The primer may determine whether any registered payment applications are available (e.g., by determining the value of the appCount variable) 120. If no registered payment applications are available, the primer may display a message that no payment applications are available 122 and payment processing may terminate 124. Otherwise, as shown in FIG. 1B, the primer may display a list of nicknames for the available payment applications 126 and prompt the user to select a desired payment application. Upon selection of a payment application 128, the primer may prompt the user to enter a passcode 130 for the selected application. Once the user enters a passcode 132, the primer will verify whether the correct passcode was entered and set a verifiedFlag variable based upon the returned value of a verifyPasscode function 134.

Figure 2C:
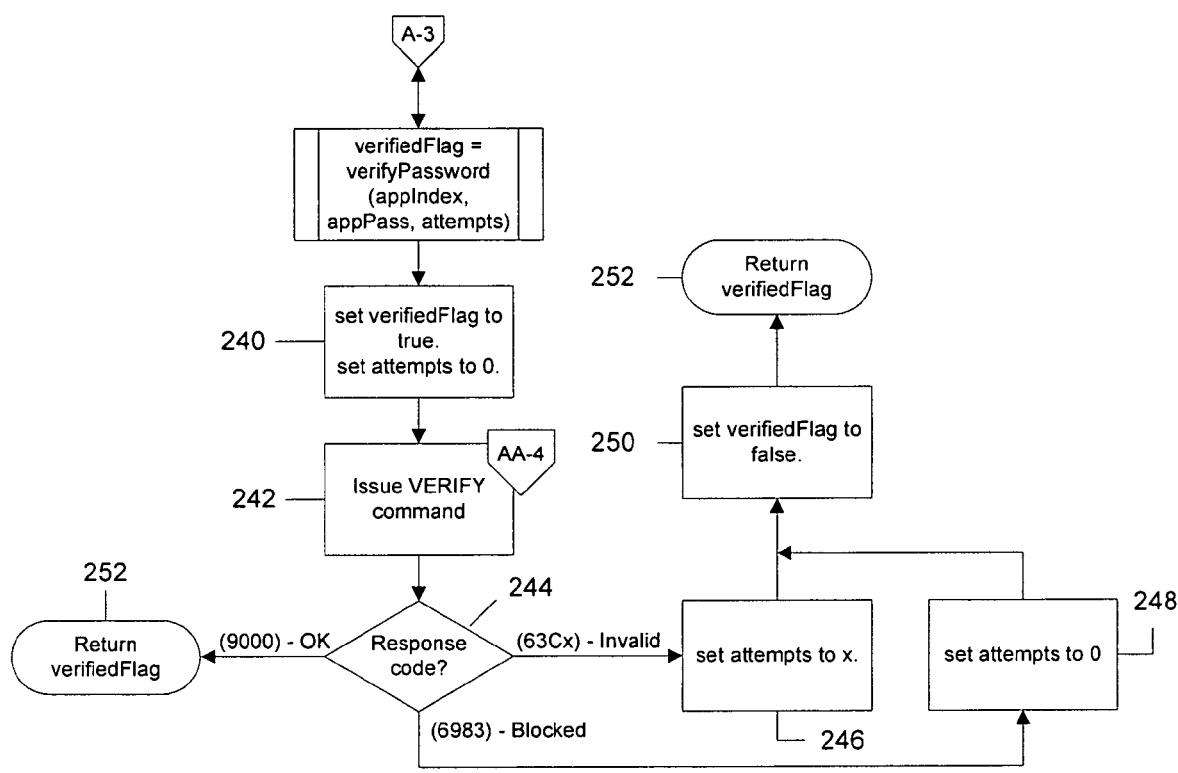

In an embodiment, the passcode may be verified utilizing the process shown in FIG. 2C. As shown in FIG. 2C, a verifiedFlag variable is initialized to "true" and a number of attempts variable is initialized to zero 240. The primer may then issue a VERIFY command 242, the operation of which is depicted in FIG. 3D. As shown in FIG. 3D, the primer may determine if the passcode has been previously blocked 350. If it has, an error code may be returned to the calling application 352. Otherwise, the primer may compare the entered passcode against a stored passcode 354. If the two passcodes do not match, the primer may decrement a TriesRemaining variable 356. The TriesRemaining variable is a configurable variable which is initially set to a value equal to the number of attempts a user will have to enter the correct passcode. An error code is then returned to the process shown in FIG. 2C. If the entered passcode matches the stored passcode for the application, the primer may set the payment application state variable to the personalized state 360 and return an OK code to the calling application 362.

Returning to FIG. 2C, the primer may then examine the response code 244. If the response code is an error code indicating that the passcode has been blocked, the primer may set the number of attempts to zero 248 and the verifiedFlag variable to "false" 250 indicating that the application is not enabled, and the verified flag is returned 252. If the response code is an error code indicating that the entered passcode did not match the stored passcode for the application, the primer may set the number of attempts variable to the number of tries remaining returned by the VERIFY command 246 and the verifiedFlag variable to "false" 250 indicating that the application is not enabled, and the verified flag is returned 252. If the response code is an OK code, the verifiedFlag variable which will be set to the initialized value of "true" may be returned to the processing shown in FIG. 1B 253.

Figure 4C:
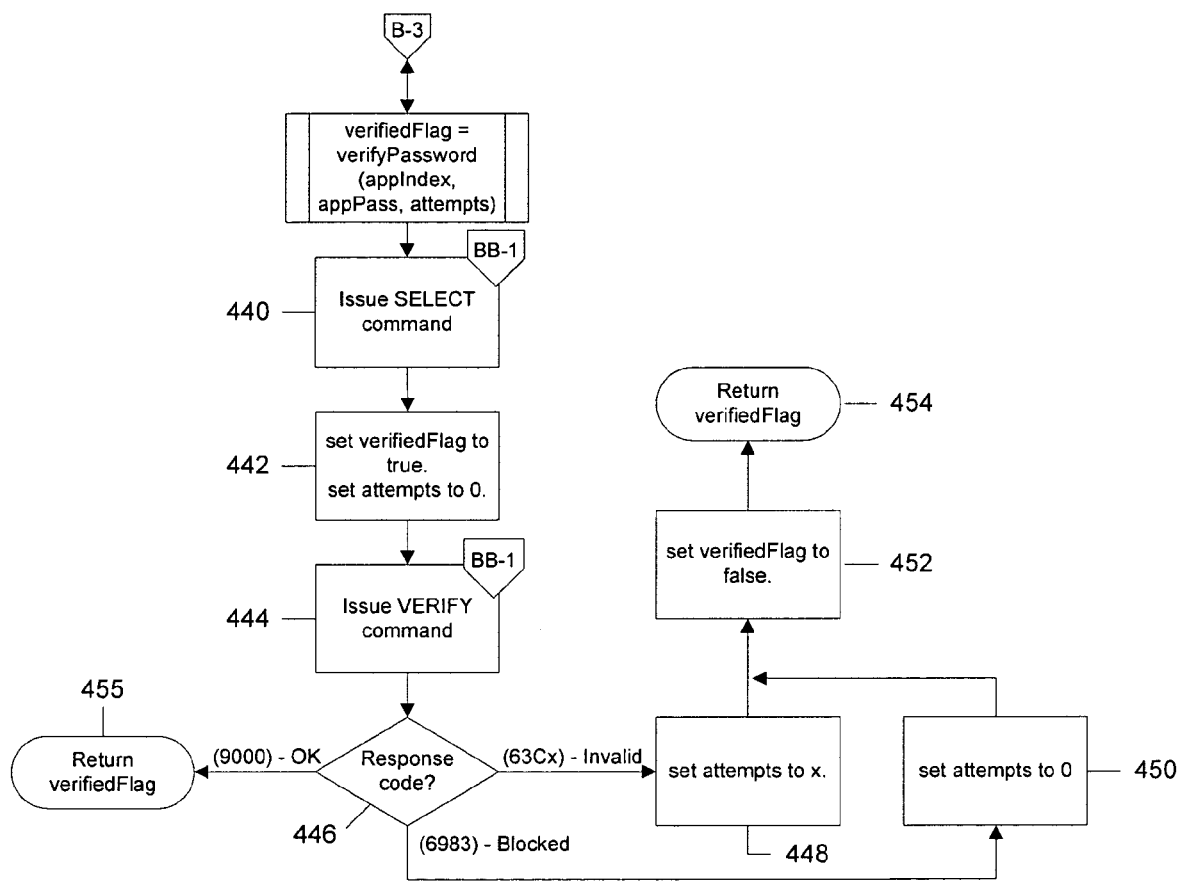

In an alternate embodiment, the verify passcode function may utilize the process shown in FIG. 4C. As shown in FIG. 4C, the primer may issue a full SELECT command for the selected payment application 440. The operation of the full SELECT command is described above with reference to FIG. 5A and FIG. 5B. The verifiedFlag variable is then initialized to "true" and the number of attempts variable is initialized to zero 442. The primer may also issue a VERIFY command 444. The operation of the VERIFY command is described with reference to FIG. 5A and FIG. 5B starting at 540.

Since a VERIFY passcode command is requested, the decision at 502 is answered negatively. The VERIFY passcode command is then sent to the currently selected application 514, and a determination is made as to whether the controller for the appropriate application is currently selected 516. This determination will return "yes" in every instance except upon occurrence of an abnormal event 517, such as when no application controllers exist on the device. If the controller for the appropriate application has been selected, the VERIFY passcode command is executed 540. As shown in FIG. 5B, a determination is made as to whether the passcode has been blocked for the application 542. If the passcode is blocked, an error code may be returned 544. Otherwise, the entered passcode may be compared to a stored passcode 546. If the passcodes do not match, the number of remaining times a passcode may be entered will be decremented 548, and an error code is returned 550. If the passcodes match, a variable indicating the correct passcode has been entered is set to "true" 552 and an OK response code is returned 554.

Returning to FIG. 4C, the primer may examine the response code 446. If the response code is an error code indicating that the passcode has been blocked, the primer may set the number of attempts to zero 450, set the verifiedFlag variable to "false" 452, and return to the processing in FIG. 1B 454. If the response code is an error code indicating that the passcode was incorrect, the primer may set the number of attempts to the number of tries remaining returned by the VERIFY command 448. In addition, the verifiedFlag variable is set to "false" 452 and processing is returned in FIG. 1B 454. If the response code is an OK code, the primer may return the verifiedFlag variable to the calling application 455.

Figure 6C:
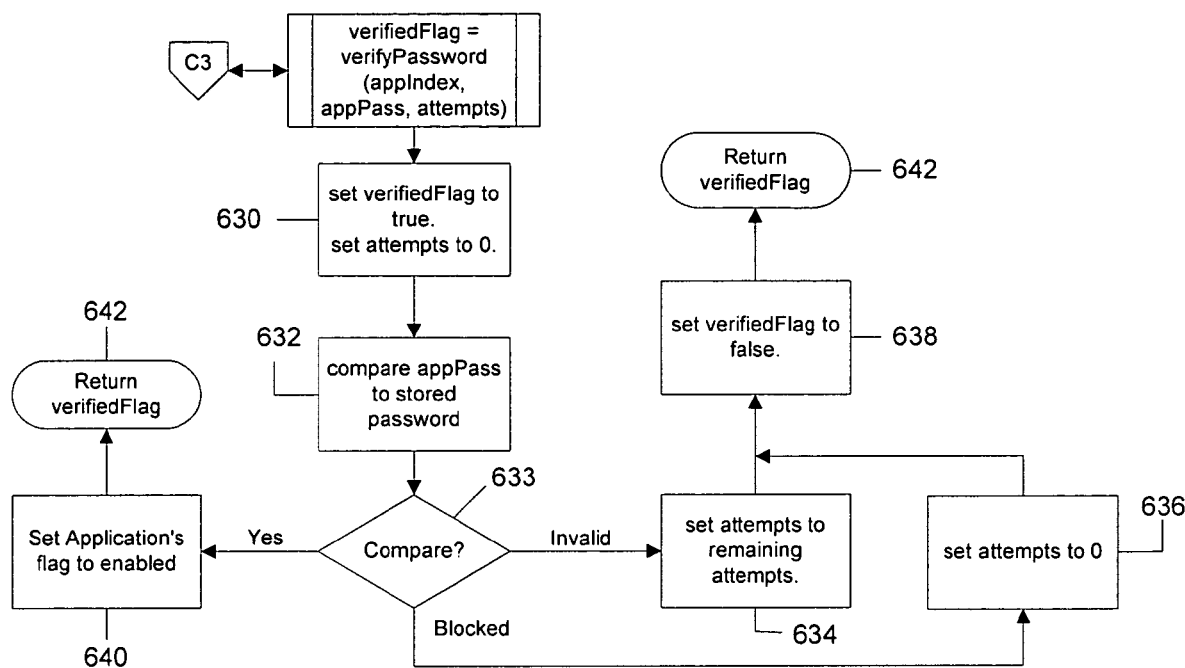

In an alternate embodiment, the verifyPasscode function may utilize the process shown in FIG. 6C. As shown in FIG. 6C, the verifiedFlag variable is initialized to "false" and the number of attempts variable is initialized to zero 630. The passcode entered by the user is compared to a stored passcode for the payment application 632. The results of the comparison are then analyzed 633. If the passcode for the application is blocked, the number of attempts variable is set to zero 636. The verifiedFlag variable is set to "false" 638, and processing returns to FIG. 1B 642. If the passcode entered by the user does not match the passcode stored for the application, the number of attempts is set to the number of tries remaining 634. The verifiedFlag variable is then set to "false" 638, and processing returns to FIG. 1B 642. If the passcodes match, the primer may enable the application for use 640, and return to the processing of FIG. 1B.

Returning to FIG. 1B, the value of the verifiedFlag variable returned by the verifyPasscode function is examined 136. If the verifiedFlag variable is "false", the primer determines the number of attempts remaining 138. If the number of attempts remaining is zero, the primer displays a message to the user stating that the application is inaccessible 140 and displays the previously generated list of nicknames 126. If the number of attempts remaining does not equal zero, the primer may request the user to re-enter the passcode 142 and may state the number of attempts remaining 128.

If the verifiedFlag variable is "true", the primer may open a channel to proximity communications over a proximity interface 144, and may loop while waiting for an event to occur 146. Possible events may include, for example, a timeout, a user action, or a proximity communication. A timeout may occur in a plurality of circumstances, such as, for example, if a predetermined time lapses within which the transaction should occur, if a predetermined time between proximity communications lapses prior to completion of the communication, or if the proximity communication completes. A user action may include, for example, a user canceling the transaction prior to completion of the transaction. A proximity communication may include, for example, the transmission to or receipt of data from the selected application. In the case of a timeout event or a user action event, the primer may call a disableApp function 148 and exit when the disableApp function completes 150. In the case of a proximity communication event, the primer may call a paymentProcess function 152.

Figure 2D:
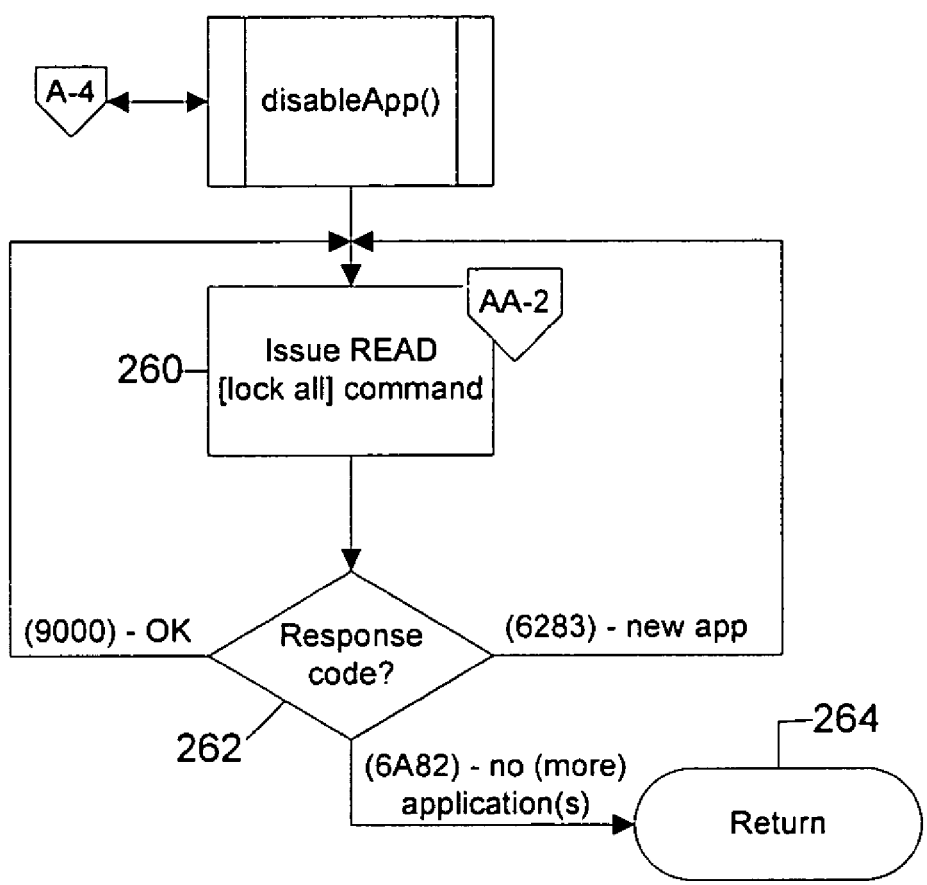

In an embodiment, the process flow for the disableApp function 148 is shown in FIG. 2D. As shown in FIG. 2D, the primer may issue a READ command to lock a payment application 260. The operation of the READ command 260 is described above with reference to FIG. 3B. The primer may examine the response code 262 returned from the READ command. If the READ command 260 generates a code indicating there was an application, the primer may issue an additional READ command 260 to lock the next application. If the response code indicates that there were no applications available, the disableApp function may return to the calling process 264.

Figure 4D:
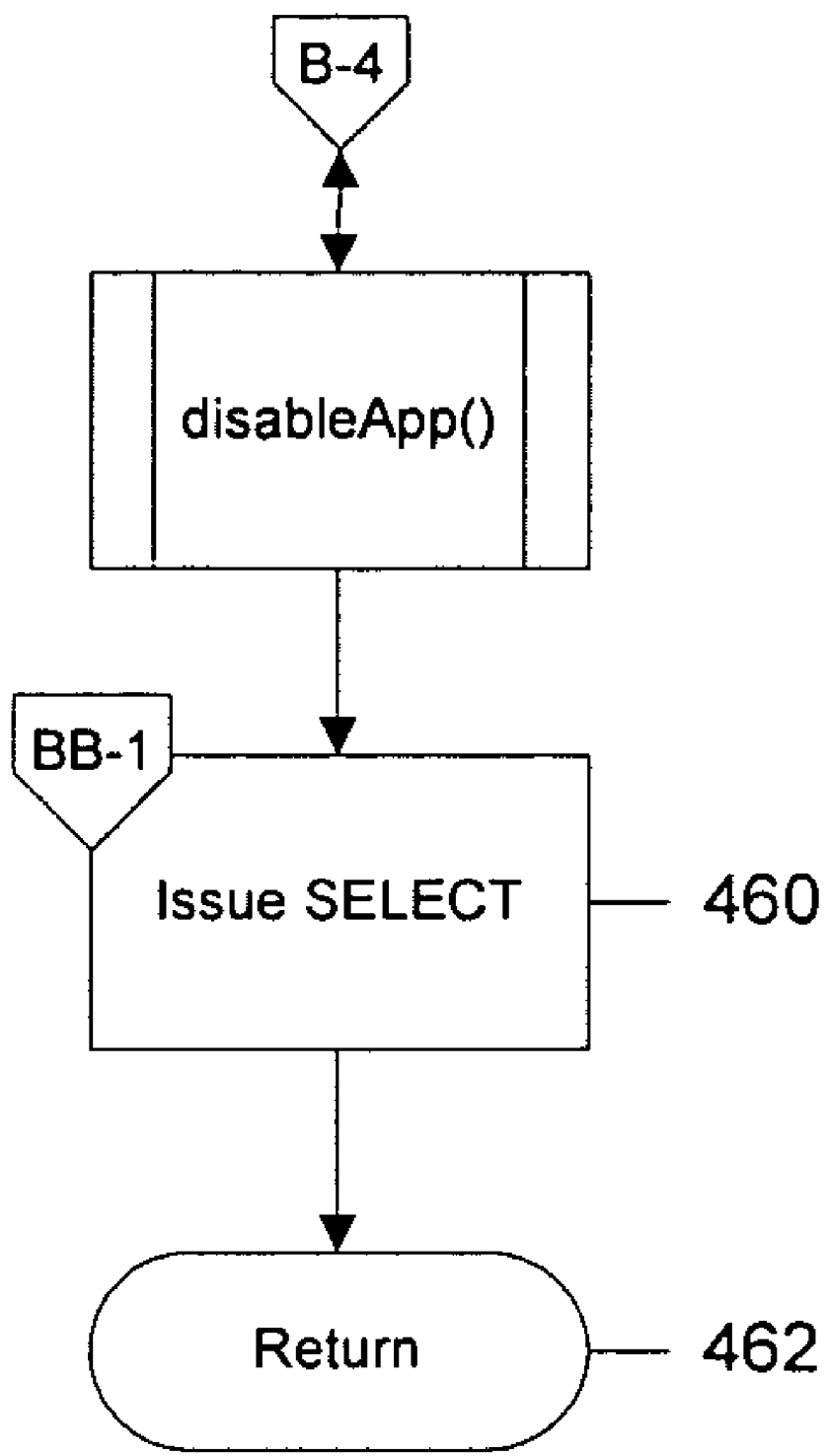

In an alternate embodiment, the process flow for the disableApp function 148 is shown in FIG. 4D. As shown in FIG. 4D, the primer may issue a full SELECT command 460. The operation of the full SELECT command 460 is described above in reference to FIG. 5A and FIG. 5B. The disableApp function may then return to the calling process 462.

Figure 6D:
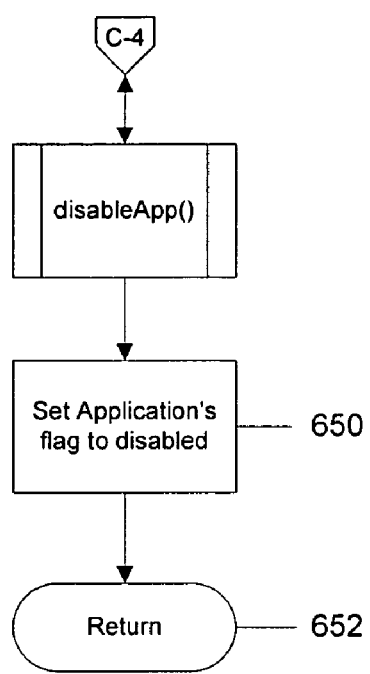

In an alternate embodiment the process flow for the disableApp function 148 is shown in FIG. 6D. As shown in FIG. 6D, the primer may disable the application 650 by, for example, setting an application enabled flag to "false". The disableApp function may then return to the calling process 652.

Figure 2E:
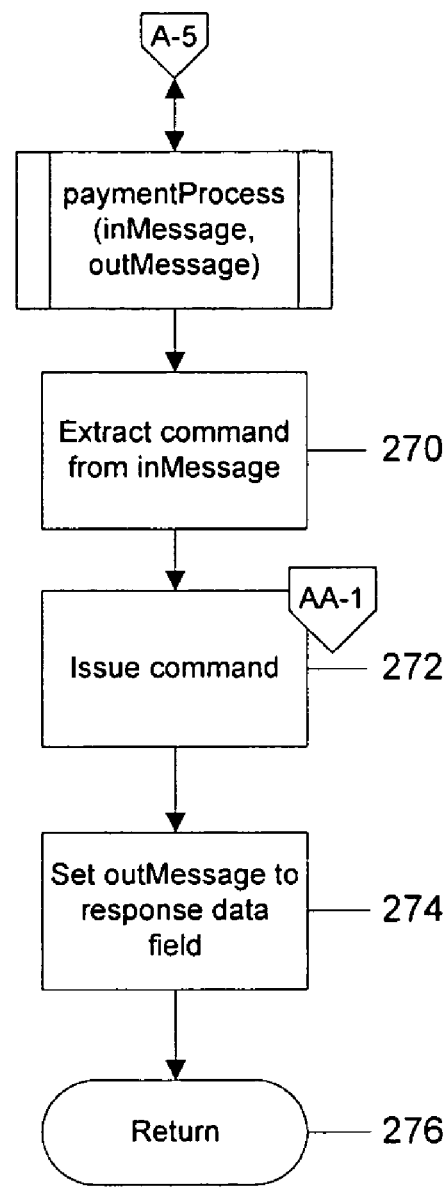

In an embodiment, the process flow for the paymentProcess function 152, is shown in FIG. 2E. As shown in FIG. 2E, the primer may extract a command from an incoming message 270. If the command is a SELECT PPSE command 272, the processing is described with reference to FIG. 3A.

Figure 3A:
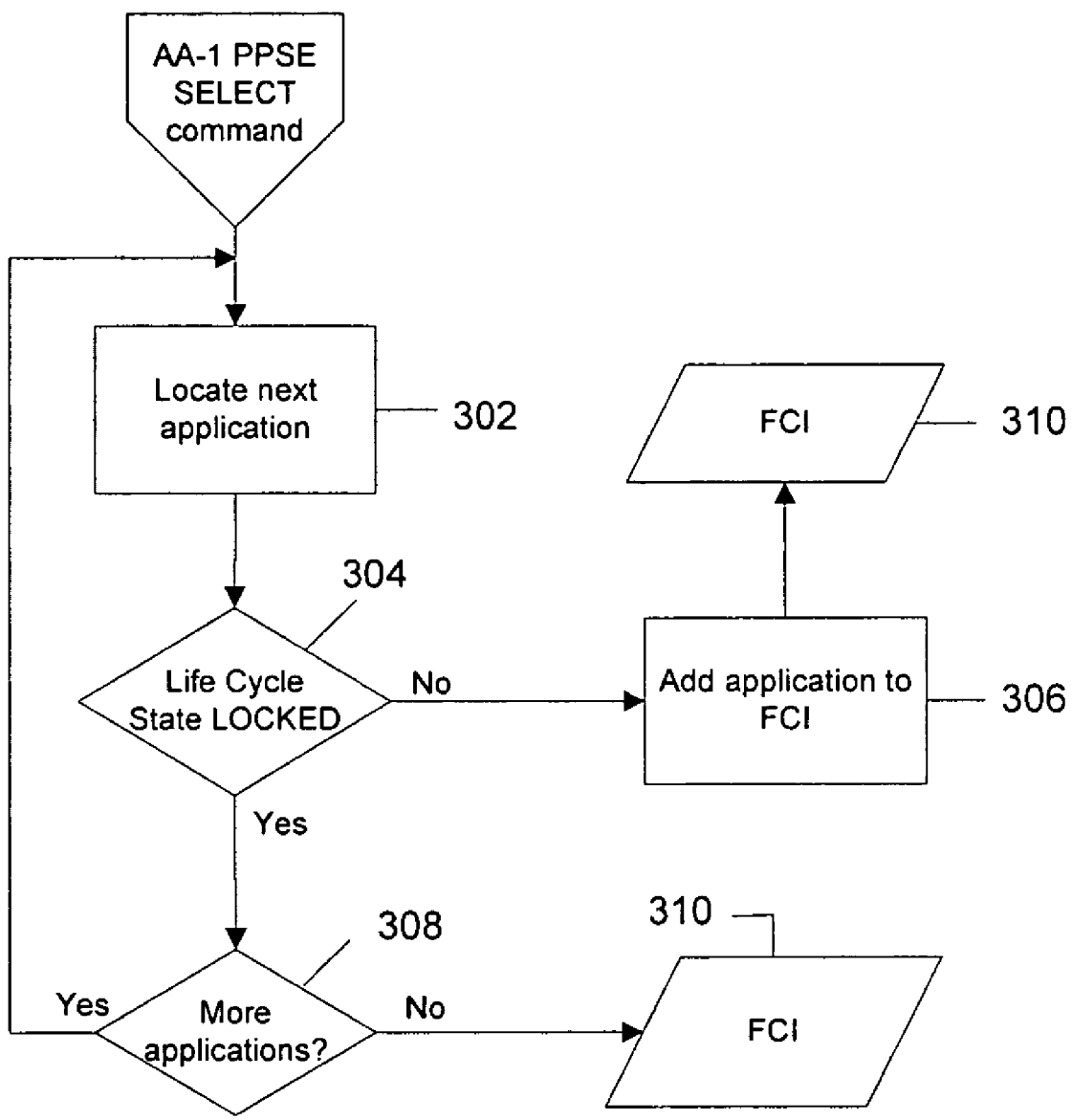
FIGS. 3A–D are flow diagrams of particular command operations identified in FIGS. 2A–E according to an exemplary process flow embodiment of the present invention.
Figure 3B:
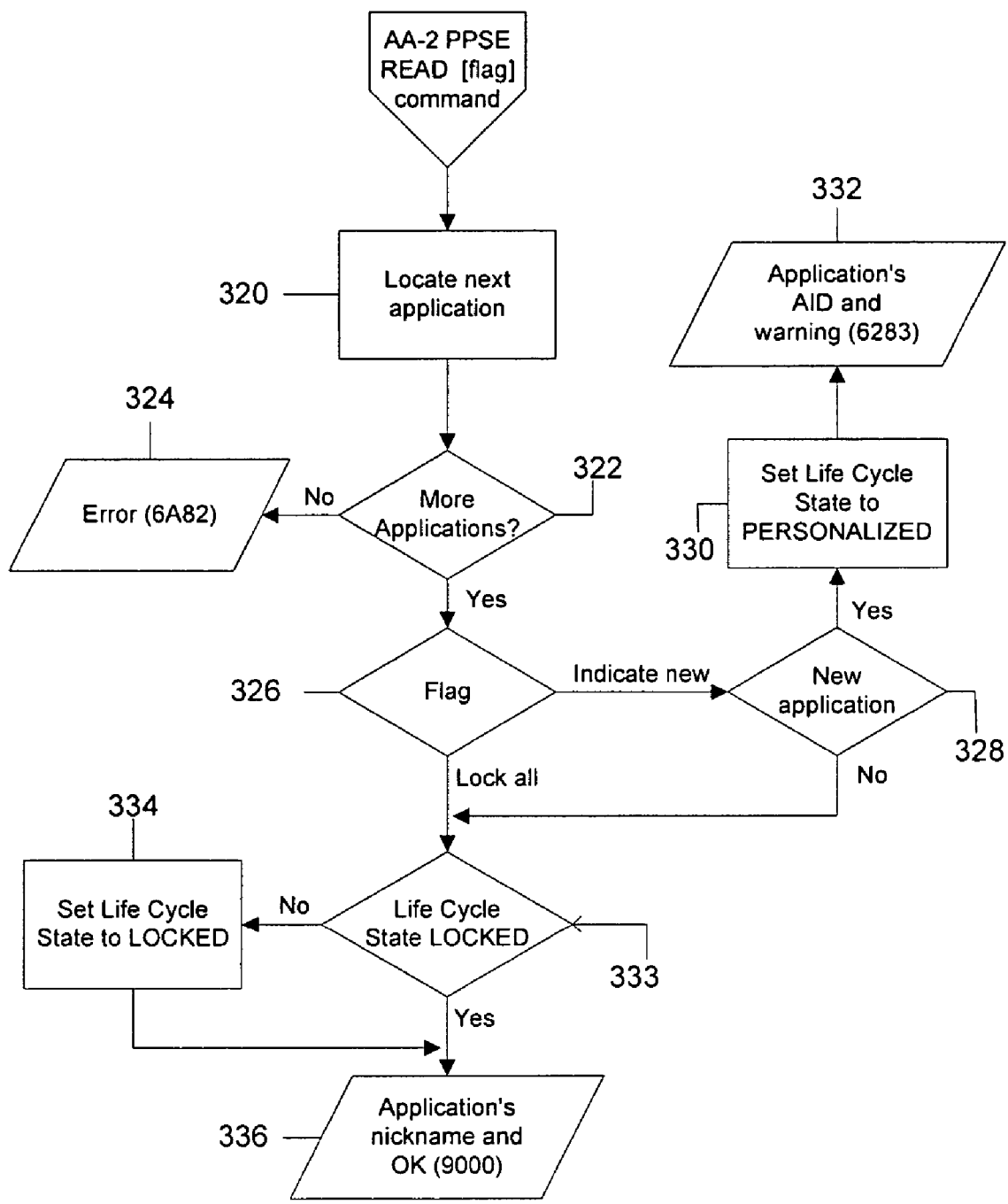
Figure 3C:
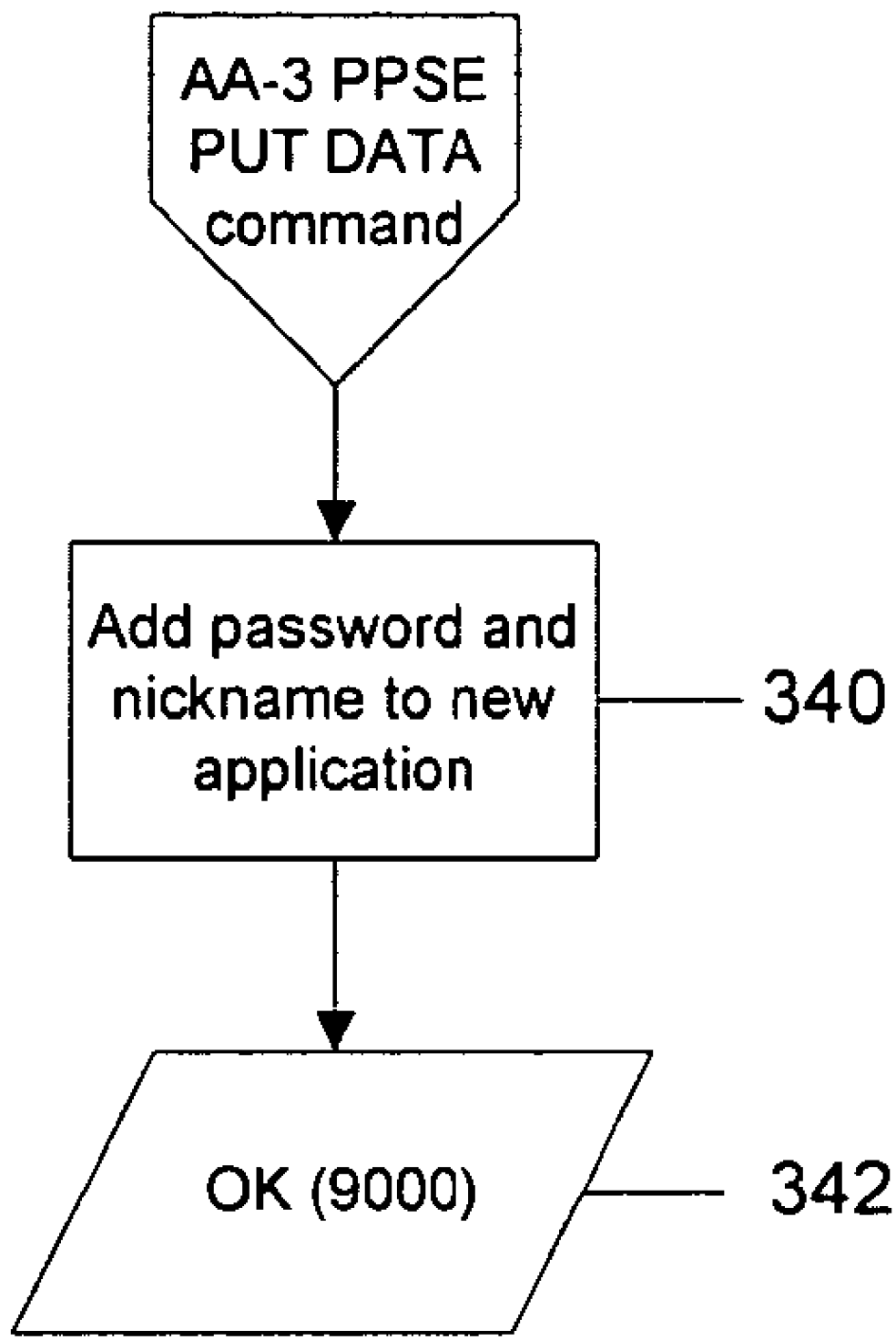
Figure 3D:
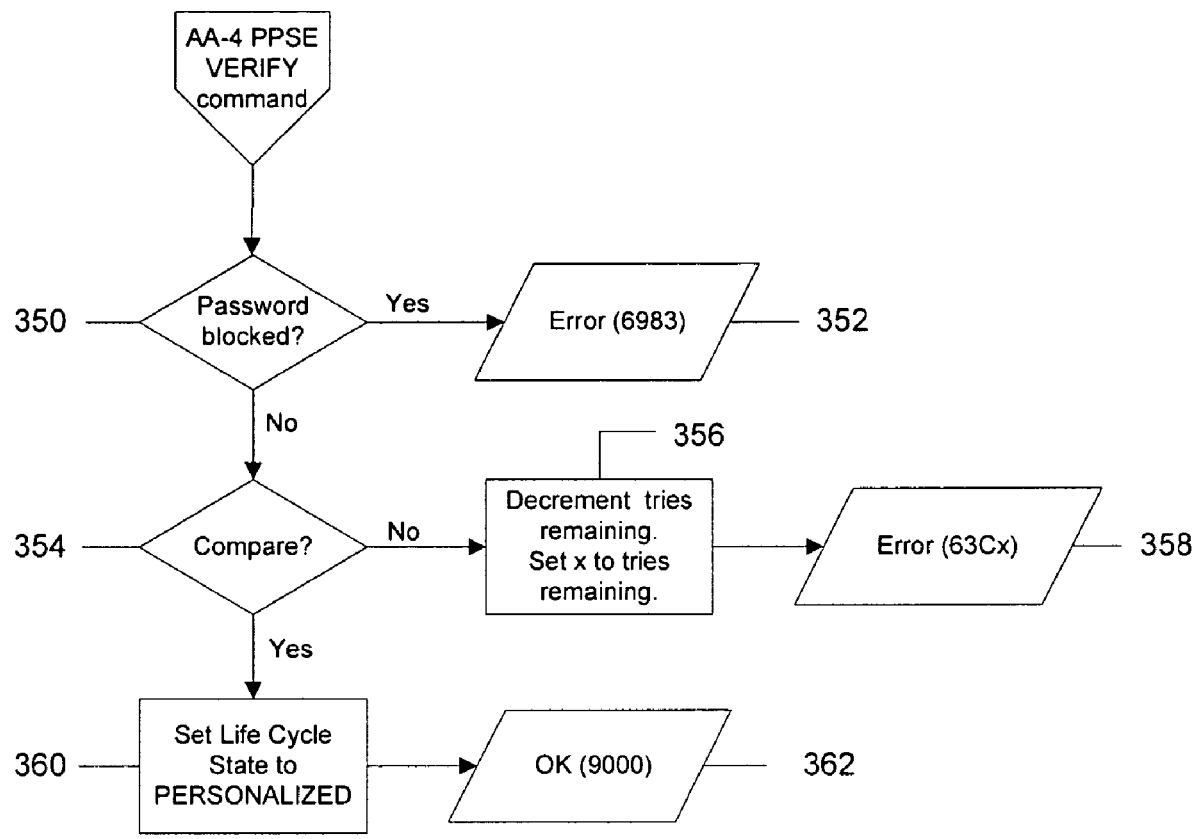

Turning now to FIG. 3A, the first payment application is located 302. The state variable of the payment application is then checked to determine if it is set to a locked state 304. If the state variable is not set to a locked state, the application is added to a File Control Information ("FCI") list 306 and the FCI list is returned 310 to the processing in FIG. 2E. If the state variable is set to a locked state 304, the primer checks if there are more applications present 308. If there are more applications present, the processing repeats beginning at step 302. If there are no additional applications present, the FCI list will be returned 310. The FCI list will either identify the first located application with a state variable not set to locked or will return an empty file indicating that all applications have a state variable set to locked.

Returning to FIG. 2E, the primer may then utilize the information and generate an outgoing message from the information returned by the processing of the command 274. The outgoing message may be returned to the calling process 276 and transmitted over the proximity interface.

Figure 4E:
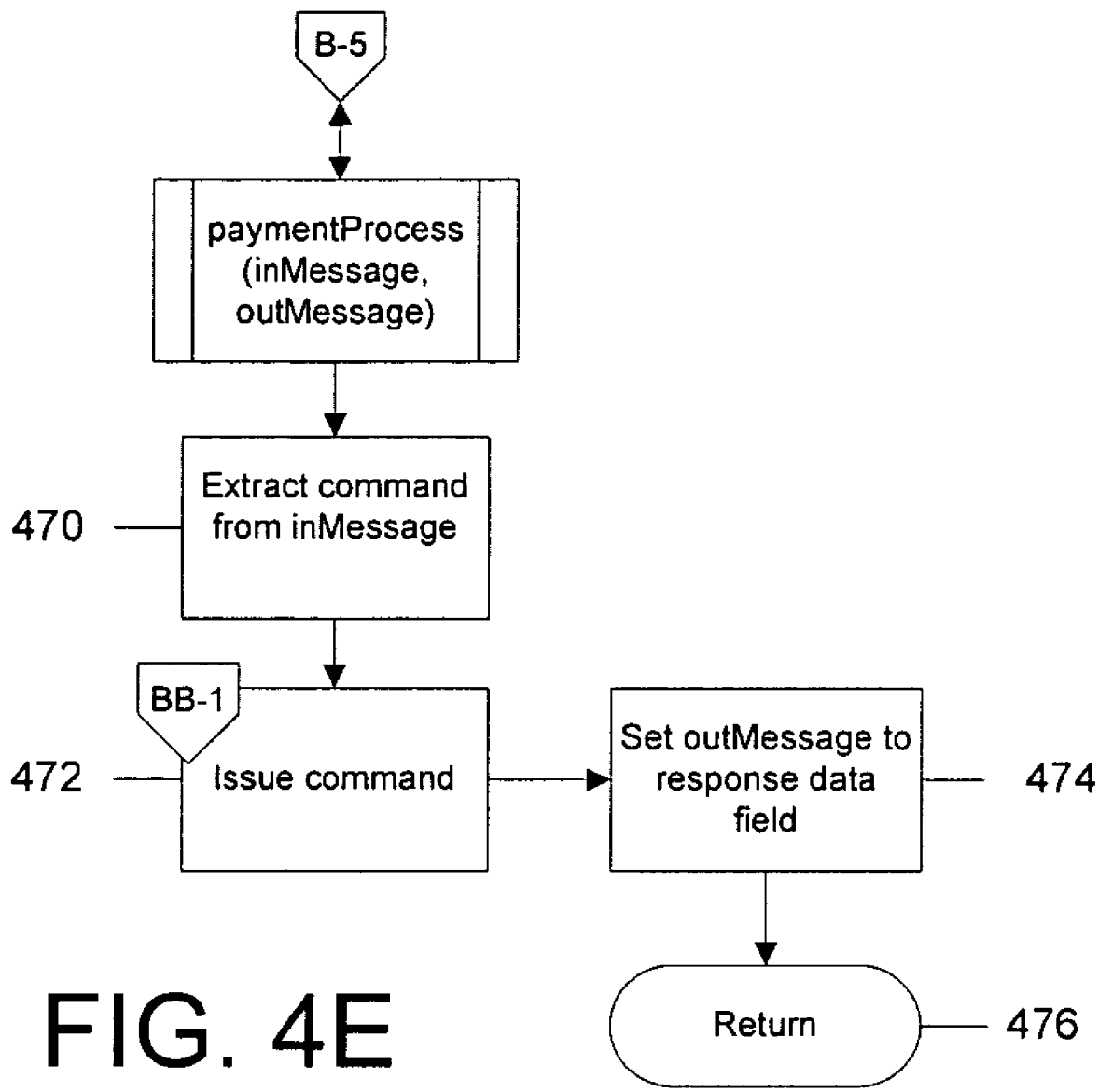

In an alternate embodiment, the process flow for the paymentProcess function 152 is as shown in FIG. 4E. As shown in FIG. 4E, the primer may extract a command from an incoming message 470. The primer may issue the command 472, such as depicted with reference to FIG. 5A and FIG. 5B starting at step 530 or 570.

As shown in FIG. 5A, the decision at 502 is either answered negatively or if answered positively, the decision at 504 and 512 would both be answered negatively resulting, in all cases, the command being then sent to the currently selected application 514, and a determination is made as to whether the controller for the appropriate application is currently selected 516. This determination will return "yes" in every instance except upon occurrence of an abnormal event 517, such as when no application controllers exist on the device. If controller for the appropriate application is selected and as the command would not be a full or partial SELECT 520, a VERIFY command 540 or a PUT DATA command 560, the command is either a selecting PPSE command 530 or a selecting payment or other payment command 570. If the command is a SELECT PPSE command 472, the processing is described in reference to FIG. 5B 530. A determination is made of whether the appropriate passcode has been entered 532. If the passcode has been previously correctly presented, the application is added to a File Control Information ("FCI") list and the FCI list is returned 536. If the passcode has not been presented or was previously incorrectly presented an empty FCI list is returned 534. If the command is a selecting payment or other payment command 472, the processing is described in reference to FIG. 5B 570. A determination is made of whether the appropriate passcode has been entered 572. If the passcode has not been presented or was previously incorrectly presented, an error code is generated 574. If the passcode has been previously correctly presented, the command is forwarded to the payment application 576 for processing.

Returning to FIG. 4E, an outgoing message may be generated based on the information returned by the processing of the command 474. The outgoing message may be returned to the calling process 476 and transmitted over the proximity interface.

Figure 6E:
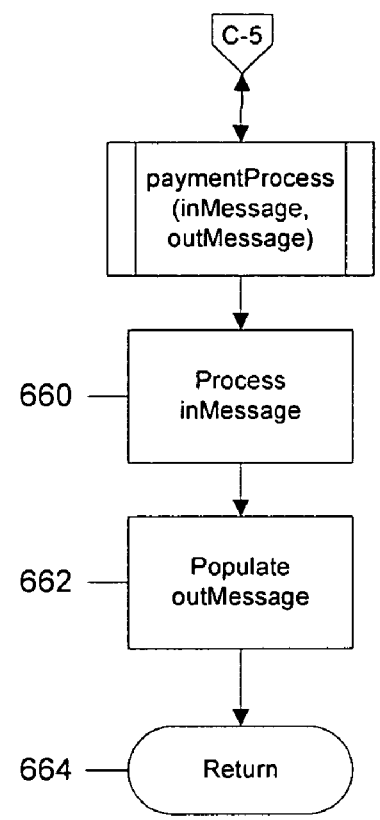

In an alternate embodiment, the process flow for the paymentProcess function 152 is shown in FIG. 6E. As shown in FIG. 6E, the primer may process an incoming message 660, populate an outgoing message based on the result of processing the incoming message 662, and return the outgoing message to the calling process 664 so that the outgoing message may be transmitted over the proximity interface.

Upon completion of the disableApp function 148 or the paymentProcess function 152, the primer may terminate 150 and may return operational control to other functions of the mobile electronic device. For example, the primer may return control to a program which operates a main menu.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for managing one or more data transfer applications on a mobile electronic device, the method comprising:
   disabling all of the one or more data transfer applications on the electronic device;
   identifying one or more of the data transfer applications which have been registered for use on the electronic device;
   displaying an identifier for one or more of the registered data transfer application on the electronic device;
   receiving, from a user of the electronic device, a selection for one of the data transfer applications;
   enabling the selected data transfer application for use by the user when the user satisfies an authentication mechanism that is independent of the selected data transfer application; and
   disabling the selected data transfer application.

2. The method of claim 1 wherein the authentication mechanism comprises entry by the user of a first authentication code is compared to a second authentication code for the data transfer application.

3. The method of claim 1 wherein the authentication mechanism comprises the entry of a first personal identification number which is compared to a second personal identification number for the data transfer application.

4. The method of claim 1 wherein the authentication mechanism comprises comparing a biometric sample supplied by the user with a biometric template associated with the data transfer application.

5. The method of claim 4 wherein the biometric sample comprises one or more of the following:
   a fingerprint;
   a facial scan;
   a retinal image;
   an iris scan; and
   a voice print.

6. The method of claim 1 wherein the authentication mechanism comprises comparing a signature supplied by the user with a signature template associated with the data transfer application.

7. The method of claim 6 wherein the signature supplied by the user is electronically compared to the signature template.

8. The method of claim 1, further comprising:
   if the authentication mechanism is not satisfied, prompting the user to re-attempt authentication up to a predetermined number of times.

9. The method of claim 8, further comprising:
   prohibiting access to the selected data transfer application when the authentication mechanism has failed a predetermined number of times.

10. The method of claim 1 further comprising:
    transmitting first transaction information from the mobile electronic device to a second device, wherein the first transaction information comprises data uniquely associated with the selected data transfer application; and receiving at the mobile electronic device second transaction information wherein the second transaction information is provided to the selected data transfer application to complete processing of a data transfer and further wherein the second transaction information is received from the second device.

11. The method of claim 10 wherein transmitting the first transaction information occurs over a wireless interface.

12. The method of claim 10 wherein the second transaction information is received over a wireless interface.

13. The method of claim 1 wherein the identifier is a user-specified nickname for the data transfer application.

14. The method of claim 1 wherein displaying an identifier for the one or more registered data transfer applications comprises displaying only identifiers for representations of one or more data transfer applications associated with transactions of a user-specified type.

15. The method of claim 14 wherein available user-specified transaction types comprise one or more of the following:
    credit card transactions;
    debit card transactions;
    calling card transactions;
    stored value transactions;
    loyalty card transactions; and
    coupon transactions.

16. The method of claim 1 wherein the mobile electronic device comprises one or more of the following:
    a cellular phone;
    a removable memory card;
    a subscriber information module;
    a personal digital assistant;
    a pager;
    a walkie-talkie;
    an integrated circuit card;
    a cellular phone in communication with a subscriber interaction module
    a cellular phone in communication with a removable memory card;
    a personal digital assistant in communication with a subscriber information module; and
    a personal digital assistant in communication with a removable memory card.

17. The method of claim 1 further comprising registering one or more data transfer application for use by the user.

18. The method of claim 17 wherein registering the one or more data transfer applications comprises, for each data transfer application:
    prompting the user to enter the identifier for the data transfer application; and
    storing the user-entered identifier in memory on the mobile electronic device.

19. The method of claim 18, further comprising:
    prompting the user to enter authentication data to be used by the authentication mechanism to authenticate the user in subsequent uses of the data transfer application; and
    storing the authentication data in memory on the mobile electronic device.

20. The method of claim 17 wherein the step of registering one or more data transfer applications is performed by a service provider for that application.

21. The method of claim 17 wherein the step of registering one or more data transfer applications is performed by a provider of the mobile electronic device.

22. The method of claim 1 wherein the disabling step occurs following completion of processing by the enabled data transfer application.

23. The method of claim 1 wherein the disabling step occurs upon a user-initiated action.

24. The method of claim 1 wherein the disabling step occurs when the data transfer application has not completed processing within a predetermined time period.

25. A method for conducting a data transfer transaction, the method comprising:
    receive a selection for a data transfer application from one or more data transfer applications on a mobile electronic device;
    enabling the selected data transfer application when the user satisfies an authentication mechanism that is independent of the selected data transfer application;
    processing a transaction using the selected data transfer application, wherein the transaction does not require an additional user authentication; and
    disabling the selected data transfer application.

26. The method of claim 25 wherein the authentication mechanism comprises entry by the user of a first authentication code which is compared to a second authentication code for the data transfer application.

27. The method of claim 25 wherein the authentication mechanism comprises the entry of a first personal identification number which is compared to a second personal identification number for the data transfer application.

28. The method of claim 25 wherein the authentication mechanism comprises comparing a biometric sample supplied by the user with a biometric template associated with the data transfer application.

29. The method of claim 28 wherein the biometric sample comprises one or more of the following:
    a fingerprint;
    a facial scan;
    a retinal image;
    an iris scan; and
    a voice print.

30. The method of claim 25 wherein the authentication mechanism comprises comparing a signature supplied by the user with a signature template associated with the data transfer application.

31. The method of claim 30 wherein the signature supplied by the user is electronically compared to the signature template.

32. The method of claim 25, further comprising:
    if the authentication mechanism is not satisfied, prompting the user to re-attempt authentication up to a predetermined number of times.

33. The method of claim 32, further comprising:
    prohibiting access to the selected data transfer application when the authentication mechanism has failed a predetermined number of times.

34. The method of claim 25 wherein processing the transaction comprises:
    transmitting first transaction information from the mobile electronic device to a second device, wherein the first transaction information comprises data uniquely associated with the selected data transfer application; and
    receiving at the mobile electronic device second transaction information wherein the second transaction information is provided to the selected data transfer application to complete processing of a data transfer and further wherein the second transaction information is received from the second device.

35. The method of claim 34 wherein transmitting first transaction information comprises transmitting the first transaction information over a wireless interface.

36. The method of claim 34 wherein receiving second transaction information comprises receiving the second transaction information over a wireless interface.

37. The method of claim 25 wherein the transaction comprises one or more of the following:
a credit card transaction;
a debit card transaction;
a calling card transaction;
a stored value transaction;
a loyalty card transaction; and
a coupon transaction.

38. The method of claim 25 wherein the mobile electronic device comprises one or more of the following:
a cellular phone;
a removable memory card;
a subscriber information module;
a personal digital assistant;
a pager;
a walkie-talkie;
an integrated circuit card;
a cellular phone in communication with a subscriber interaction module
a cellular phone in communication with a removable memory card;
a personal digital assistant in communication with a subscriber information module; and
a personal digital assistant in communication with a removable memory card.

39. A mobile device for managing a plurality of data transfer applications, the device comprising:
a processor;
a display operably connected to the processor;
at least one input device operably connected to the processor; and
a computer-readable storage medium operably connected to the processor, wherein the computer-readable storage medium contains one or more programming instructions for performing a method of managing the one or more data transfer applications, the method comprising:
disabling all of the data transfer applications on the device;
displaying an identifier for at least one of the data transfer applications on the electronic device;
receiving, from a user, a selection of one of the data transfer applications; and
enabling the selected data transfer application when the user satisfies an authentication mechanism that is independent of the selected data transfer application.

40. The device of claim 39 wherein the authentication mechanism comprises entry by the user of a first authentication code which is compared to a second authentication code for the data transfer application.

41. The device of claim 39 wherein the authentication mechanism comprises the entry of a first personal identification number, which is compared to a second personal identification number for the data transfer application.

42. The device of claim 39 wherein the authentication mechanism comprises comparing a biometric sample supplied by the user with a biometric template associated with the data transfer application.

43. The device of claim 42 wherein the biometric sample comprises one or more of the following:
a fingerprint;
a facial scan;
a retinal image;
an iris scan; and
a voice print.

44. The device of claim 39 wherein the authentication mechanism comprises comparing a signature supplied by the user with a signature template associated with the data transfer application.

45. The device of claim 44 wherein the signature supplied by the user is electronically compared to the signature template.

46. A system for conducting an exchange of data, the system comprising:
a processor;
a display operably connected to the processor;
at least one input device operably connected to the processor;
a communications interface operably connected to the processor; and
a computer-readable storage medium operably connected to the processor, wherein the computer-readable storage medium contains one or more programming instructions for performing a method of conducting the exchange of data, the method comprising:
selecting a data transfer application from one or more data transfer applications stored on the computer-readable storage medium;
enabling the selected data transfer application when a user satisfies an authenticated mechanism that is independent of the selected data transfer application;
processing a data transfer transaction using the selected data transfer application, wherein the data transfer transaction does not require additional user authentication; and
disabling the selected data transfer application.

47. The system of claim 46 wherein the communications interface comprises a wireless interface.

48. The system of claim 46 wherein the authentication mechanism comprises entry by the user of a first authentication code which is compared to a second authentication code associated with the data transfer application.

49. The system of claim 46 wherein the authentication mechanism comprises the entry of a first personal identification number which is compared to a second personal identification number for the data transfer application.

50. The system of claim 46 wherein the authentication mechanism comprises comparing a biometric sample supplied by the user with a biometric template associated with the data transfer application.

51. The system of claim 50 wherein the biometric sample comprises one or more of the following:
a fingerprint;
a facial scan;
a retinal image;
an iris scan; and
a voice print.

52. The system of claim 46 wherein the authentication mechanism comprises comparing a signature supplied by the user with a signature template associated with the data transfer application.

53. The system of claim 52 wherein the signature supplied by the user is electronically compared to the signature template.

* * * * *